United States Patent
Nishimura et al.

(10) Patent No.: US 10,424,763 B2
(45) Date of Patent: Sep. 24, 2019

(54) ENERGY STORAGE APPARATUS

(71) Applicants: GS Yuasa International Ltd., Kyoto-shi (JP); Honda Motor Co., Ltd., Tokyo (JP)

(72) Inventors: Yosuke Nishimura, Kyoto (JP); Yoshimasa Toshioka, Kyoto (JP); Masao Kawata, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 250 days.

(21) Appl. No.: 15/293,001

(22) Filed: Oct. 13, 2016

(65) Prior Publication Data

US 2017/0110700 A1  Apr. 20, 2017

(30) Foreign Application Priority Data

Oct. 19, 2015  (JP) .................. 2015-205570

(51) Int. Cl.
*H01M 2/12* (2006.01)
*H01M 10/613* (2014.01)
(Continued)

(52) U.S. Cl.
CPC ............ *H01M 2/02* (2013.01); *H01G 2/08* (2013.01); *H01G 2/10* (2013.01); *H01M 2/1016* (2013.01);
(Continued)

(58) Field of Classification Search
CPC ............. H01M 2/08; H01M 2/10; H01M 2/18
See application file for complete search history.

(56) References Cited

U.S. PATENT DOCUMENTS

| 10,027,003 B2 * | 7/2018 | Toshioka .......... H01M 2/1077 |
| 2007/0037051 A1 | 2/2007 | Kim et al. |

(Continued)

FOREIGN PATENT DOCUMENTS

| JP | 2003-323871 A | 11/2003 |
| JP | 2007-048750 A | 2/2007 |

(Continued)

*Primary Examiner* — Stewart A Fraser
*Assistant Examiner* — Rachel L Zhang
(74) *Attorney, Agent, or Firm* — McGinn I. P. Law Group, PLLC.

(57) ABSTRACT

Provided is an energy storage apparatus includes: at least one energy storage device; and a spacer disposed adjacently to the energy storage device, the spacer being configured to form a ventilation passage which allows cooling air to pass therethrough between the spacer and the energy storage device, wherein the spacer has an opposedly facing portion which opposedly faces a spacer disposed adjacently to the spacer with the energy storage device sandwiched therebetween at a position which faces the ventilation passage and is disposed adjacently to the energy storage device in a flow direction of the cooling air in the ventilation passage, one opposedly facing portion of a pair of opposedly facing portions which opposedly faces each other of the spacers disposed on both sides of the energy storage device has an extending portion extending toward the other opposedly facing portion of the pair of opposedly facing portions, and the extending portion is brought into contact with the other opposedly facing portion.

17 Claims, 10 Drawing Sheets

(51) Int. Cl.
*H01M 2/10* (2006.01)
*H01M 10/6556* (2014.01)
*H01M 2/18* (2006.01)
*H01M 2/08* (2006.01)
*H01M 10/04* (2006.01)
*H01M 10/625* (2014.01)
*H01M 2/02* (2006.01)
*H01M 10/615* (2014.01)
*H01G 2/08* (2006.01)
*H01G 2/10* (2006.01)
*H01M 10/6553* (2014.01)

(52) U.S. Cl.
CPC .......... *H01M 2/1252* (2013.01); *H01M 2/18* (2013.01); *H01M 10/0486* (2013.01); *H01M 10/613* (2015.04); *H01M 10/615* (2015.04); *H01M 10/625* (2015.04); *H01M 10/6556* (2015.04); *H01M 10/6553* (2015.04); *H01M 2220/20* (2013.01); *Y02E 60/13* (2013.01)

(56) References Cited

U.S. PATENT DOCUMENTS

| | | |
|---|---|---|
| 2008/0160395 A1 | 7/2008 | Okada et al. |
| 2010/0167115 A1 | 7/2010 | Okada et al. |
| 2011/0024207 A1 | 2/2011 | Higashino et al. |
| 2011/0159339 A1* | 6/2011 | Gregor .................. H01M 2/06 429/120 |
| 2011/0223462 A1 | 9/2011 | Kim et al. |
| 2012/0052359 A1* | 3/2012 | Yoshitake ........... H01M 2/1077 429/120 |
| 2013/0095359 A1 | 4/2013 | Yoshioka et al. |
| 2016/0036105 A1 | 2/2016 | Toshioka et al. |

FOREIGN PATENT DOCUMENTS

| | | |
|---|---|---|
| JP | 2008-166191 A | 7/2008 |
| JP | 2010-157450 A | 7/2010 |
| JP | 2011-014378 A | 1/2011 |
| JP | 5118817 B2 | 1/2013 |
| JP | 2013-084595 A | 5/2013 |
| JP | 2013-201136 A | 10/2013 |
| JP | 2013-235728 A | 11/2013 |
| JP | 2014-036001 A | 2/2014 |
| JP | 2014-182942 A | 9/2014 |
| JP | 2016-031901 A | 3/2016 |
| WO | WO 2011/002051 A1 | 1/2011 |

\* cited by examiner

ENERGY STORAGE APPARATUS

CROSS-REFERENCE TO RELATED APPLICATIONS

This application claims the benefit of Japanese patent application No. 2015-205570, filed on Oct. 19, 2015, which is incorporated by reference.

FIELD

The present invention relates to an energy storage apparatus provided with energy storage devices.

BACKGROUND

In various appliances such as an electric vehicle, a power source having large capacitance is necessary and hence, an energy storage apparatus provided with a plurality of energy storage devices is used (see JP 2010-157450 A). As shown in FIG. 13 to FIG. 15, this type of energy storage apparatus includes energy storage devices 50 and spacers 51 which are disposed adjacently to the energy storage devices 50. The energy storage devices 50 are disposed on both sides of the spacer 51, and a ventilation passage 510 which allows cooling air to pass therethrough is formed between the neighboring energy storage devices 50. Further, the spacer 51 has an opposedly facing portion 511 which opposedly faces the neighboring spacer 51 with the energy storage device 50 sandwiched therebetween at a position which faces the ventilation passage 510 and is disposed in front of the energy storage device 50 in a flow direction of cooling air in the ventilation passage 510 formed between the neighboring energy storage devices 50.

In such an energy storage apparatus 5, a gap 514 is formed between the opposedly facing portions 511 of the spacers 51 disposed on both sides of the energy storage device 50 such that the gap 514 extends from an end edge 512 of the opposedly facing portion 511 on a ventilation passage 510 side to an end edge 513 of the opposedly facing portion 511 on a side opposite to the ventilation passage 510. Accordingly, when cooling air for cooling the energy storage device 50 is supplied to the ventilation passage 510, a portion of cooling air is leaked to the outside of the energy storage apparatus 5 from the ventilation passage 514 through the gap thus reducing an effect of cooling the energy storage devices 50 in the energy storage apparatus 5.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus where cooling air supplied to a ventilation passage formed between energy storage devices minimally leaks to the outside.

An energy storage apparatus according to an aspect of the present invention includes:

at least one energy storage device; and a spacer disposed adjacently to the energy storage device, the spacer being configured to form a ventilation passage which allows cooling air to pass therethrough between the spacer and the energy storage device, wherein the spacer has an opposedly facing portion which opposedly faces a spacer disposed adjacently to the spacer with the energy storage device sandwiched therebetween at a position which faces the ventilation passage and is disposed adjacently to the energy storage device in a flow direction of the cooling air in the ventilation passage, one opposedly facing portion of a pair of opposedly facing portions which opposedly faces each other of the spacers disposed on both sides of the energy storage device has an extending portion extending toward the other opposedly facing portion of the pair of opposedly facing portions, and the extending portion is brought into contact with the other opposedly facing portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
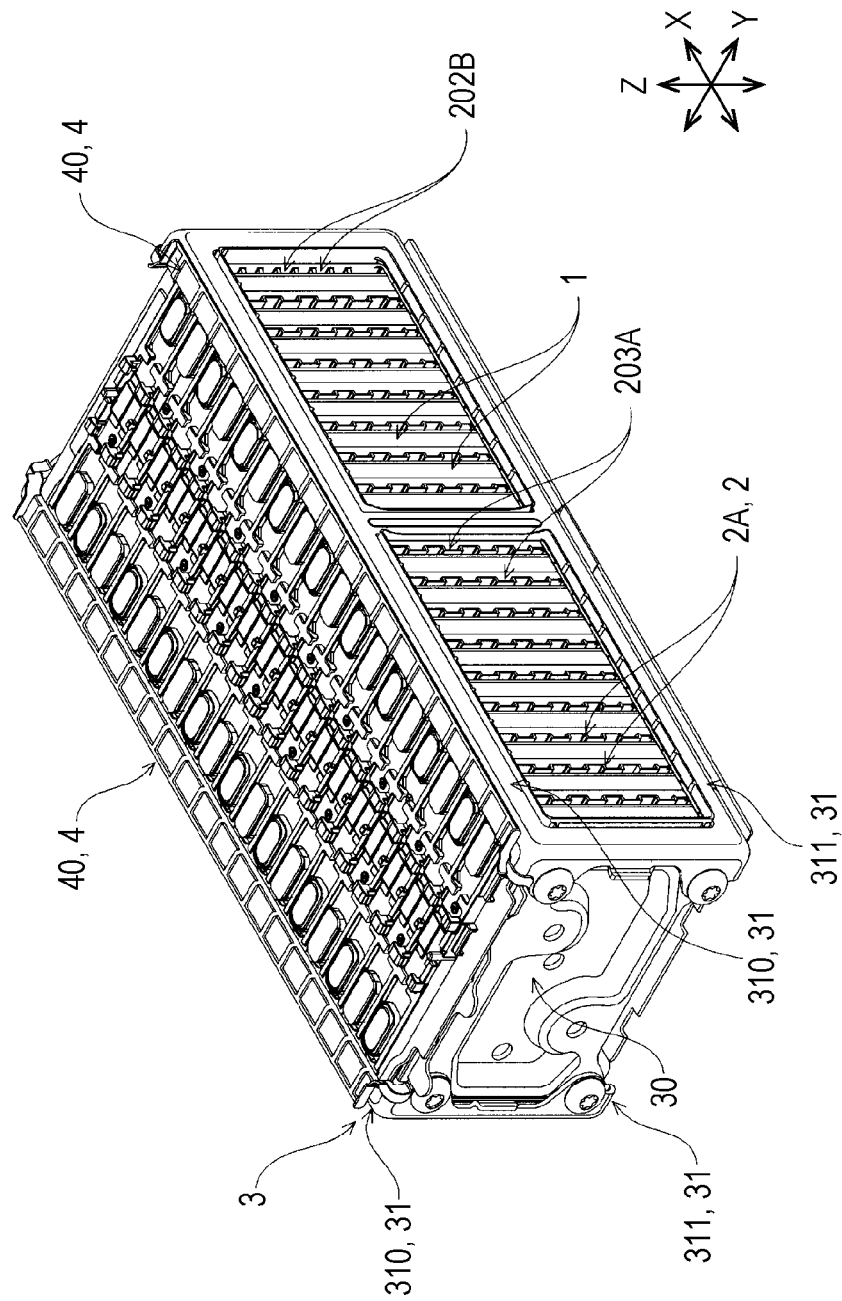
FIG. 1 is a perspective view of an energy storage apparatus according to one embodiment of the present invention.

An energy storage apparatus according to an aspect of the present invention includes:

at least one energy storage device; and a spacer disposed adjacently to the energy storage device, the spacer being configured to form a ventilation passage which allows cooling air to pass therethrough between the spacer and the energy storage device, wherein the spacer has an opposedly facing portion which opposedly faces a spacer disposed adjacently to the spacer with the energy storage device sandwiched therebetween at a position which faces the ventilation passage and is disposed adjacently to the energy storage device in a flow direction of the cooling air in the ventilation passage, one opposedly facing portion of a pair of opposedly facing portions which opposedly faces each other of the spacers disposed on both sides of the energy storage device has an extending portion extending toward the other opposedly facing portion of the pair of opposedly facing portions, and the extending portion is brought into contact with the other opposedly facing portion.

With such a configuration, due to the extending portion which extends from one opposedly facing portion to the other opposedly facing portion between the pair of opposedly facing portions, the flow of air toward the end edge on a side opposite to the ventilation passage from the end edge of the opposedly facing portion on a ventilation passage side between the opposedly facing portions is obstructed. Accordingly, it is possible to suppress a leakage of cooling air to the outside of the energy storage apparatus through between the pair of opposedly facing portions.

In the energy storage apparatus, the other opposedly facing portion may have an inclined surface which is inclined with respect to a first direction along which the pair of opposedly facing portions opposedly faces each other and a second direction orthogonal to the flow direction of the cooling air, and the extending portion may be brought into contact with at least a portion of the inclined surface.

With such a configuration, the extending portion and the inclined surface are brought into contact with each other such that a contact portion between the extending portion and the inclined surface extends in a direction which intersects with the second direction. Accordingly, it is possible to more effectively obstruct the flow of air between the opposedly facing portions from an end edge of the opposedly facing portion on a ventilation passage side to an end edge of the opposedly facing portion on a side opposite to the ventilation passage.

In the energy storage apparatus, it is preferable that the extending portion be elastically deformable due to a contact between the extending portion and the inclined surface.

With such a configuration, the extending portion is elastically deformable along the inclined surface and hence, even when the distance between the opposedly facing portions is narrowed due to an error in manufacture or the like, a change in distance can be absorbed by the elastic deformation. That is, even when the distance between the opposedly facing portions is narrowed due to an error in manufacture or the like, the extending portion is elastically deformed along the contact surface and hence, a state where the extending portion is brought into contact with the inclined surface is maintained.

In the energy storage apparatus, it is preferable that the other opposedly facing portion have a pair of inclined surfaces which forms the inclined surface, the pair of inclined surfaces be configured to opposedly face each other in a spaced-apart manner from each other in the second direction such that a distance between the pair of inclined surfaces is narrowed as the pair of inclined surfaces is away from one opposedly facing portion along a direction that the pair of opposedly facing portions opposedly faces each other, one opposedly facing portion have a pair of extending portions at a position which opposedly faces the pair of inclined surfaces, and the pair of extending portions be disposed in a spaced-apart manner from each other in the second direction such that a distance between distal ends of the pair of extending portions is smaller than the distance between the inclined surfaces at end portions of the pair of inclined surfaces on one opposedly facing portion side, and is larger than the distance between the inclined surfaces at end portions of the pair of inclined surfaces on a side opposite to one opposedly facing portion.

With such a configuration, the pair of extending portions is elastically deformed such that the narrower the distance between the opposedly facing portions, the narrower the distance between the distal ends becomes due to the pair of inclined portions. Accordingly, a force which intends to return the distance between the opposedly facing portions to an initial distance is increased. In this manner, it is possible to provide a state which is considered equal to a state where the neighboring spacers are connected to each other by an elastic body and hence, resistance against vibrations in the energy storage apparatus can be enhanced.

In the energy storage apparatus, one opposedly facing portion may have a plurality of extending portions which form the extending portion, and the other opposedly facing portion may have inclined surfaces which form the inclined surface such that the number of inclined surfaces corresponds to the number of the plurality of extending portions.

With such a configuration, due to the plurality of extending portions, it is possible to obstruct the flow of air between the pair of opposedly facing portions toward the end edge of the opposedly facing portion on a side opposite to the ventilation passage from the end edge of the opposedly facing portion on a ventilation passage side. Accordingly, it is possible to more effectively suppress a leakage of cooling air to the outside of the energy storage apparatus through between the pair of opposedly facing portions.

In the energy storage apparatus, the extending portion has an inclined surface inclined with respect to a first direction along which the pair of opposedly facing portions opposedly faces each other and with respect to a second direction orthogonal to the flow direction of the cooling air, and the other opposedly facing portion is brought into contact with at least a portion of the inclined surface of the extending portion.

With such a configuration, the extending portion and the inclined surface are brought into contact with each other such that the contact portion between the inclined surface of the extending portion and the opposedly facing portion extends in the direction which intersects with the second direction. Accordingly, it is possible to more effectively obstruct the flow of air between the opposedly facing portions toward the end edge of the opposedly facing portion on a side opposite to the ventilation passage from the end edge of the opposedly facing portion on a ventilation passage side.

In the energy storage apparatus, the extending portion may have a first inclined surface inclined with respect to a first direction along which the pair of oppositely facing portions oppositely faces each other and with respect to a second direction orthogonal to the flow direction of the cooling air, and the other oppositely facing portion may have a second inclined surface inclined with respect to the first direction along which the pair of oppositely facing portions oppositely faces each other and with respect to the second direction orthogonal to the flow direction of the cooling air, and the first inclined surface may be brought into contact with at least a portion of the second inclined surface.

With such a configuration, the extending portion (first inclined surface) and the other oppositely facing portion (second inclined surface) are brought into contact with each other such that the contact portion between the first inclined surface and the second inclined surface extends in the direction which intersects with the second direction. Accordingly, it is possible to more effectively obstruct the flow of air between the oppositely facing portions toward the end edge of the oppositely facing portion on a side opposite to the ventilation passage from the end edge of the oppositely facing portion on a ventilation passage side.

In forming the first inclining surface and the second inclined surface in the energy storage apparatus, it is preferable that an angle α of the second inclined surface with respect to the first inclined surface be set to a value which satisfies 0°<α.

When the first inclined surface and the second inclined surface are parallel to each other, there may be a case where a gap is formed between the first inclined surface and the second inclined surface due to an error in manufacture at the time of manufacturing the spacer. However, with the configuration described above, by setting the angle α larger than 0°, that is, by setting the first inclined surface and the second inclined surface not parallel to each other, it is possible to prevent the formation of the gap due to the above-mentioned error in manufacture.

In the energy storage apparatus, it is preferable that the extending portion be brought into contact with the other oppositely facing portion in a whole region of the other oppositely facing portion in the flow direction of the cooling air.

With such a configuration, in the whole region between the oppositely facing portions in the flow direction of cooling air, it is possible to obstruct the flow of air between the oppositely facing portions toward the end edge of the oppositely facing portion on a side opposite to the ventilation passage from the end edge of the oppositely facing portion on a ventilation passage side. Accordingly, it is possible to more effectively suppress a leakage of cooling air to the outside of the energy storage apparatus through between the pair of oppositely facing portions.

As described heretofore, according to the present invention, it is possible to provide an energy storage apparatus where cooling air supplied to a ventilation passage formed between energy storage devices minimally leaks to the outside of the energy storage apparatus.

Hereinafter, one embodiment of an energy storage apparatus of the present invention is described with reference to drawings. Names of respective constitutional members in this embodiment are used only for this embodiment, and may differ from names of respective constitutional members in BACKGROUND.

As shown in FIG. 1, the energy storage apparatus includes: energy storage devices 1; spacers 2 which are disposed adjacently to the energy storage devices 1; and a holder 3 which collectively holds the energy storage devices 1 and the spacers 2. The holder 3 is formed by molding using an electrically conductive material. Along with such configuration, the energy storage apparatus includes insulators 4 each of which is disposed between the energy storage devices 1 and the holder 3.

Figure 2:
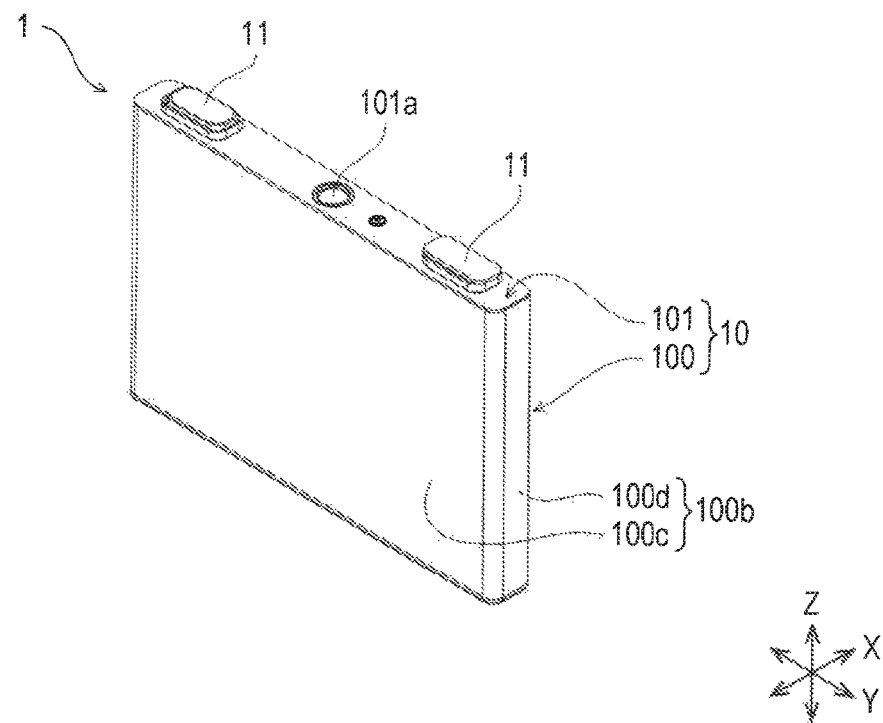
FIG. 2 is a perspective view of an energy storage device in the energy storage apparatus according to the embodiment.
Figure 3:
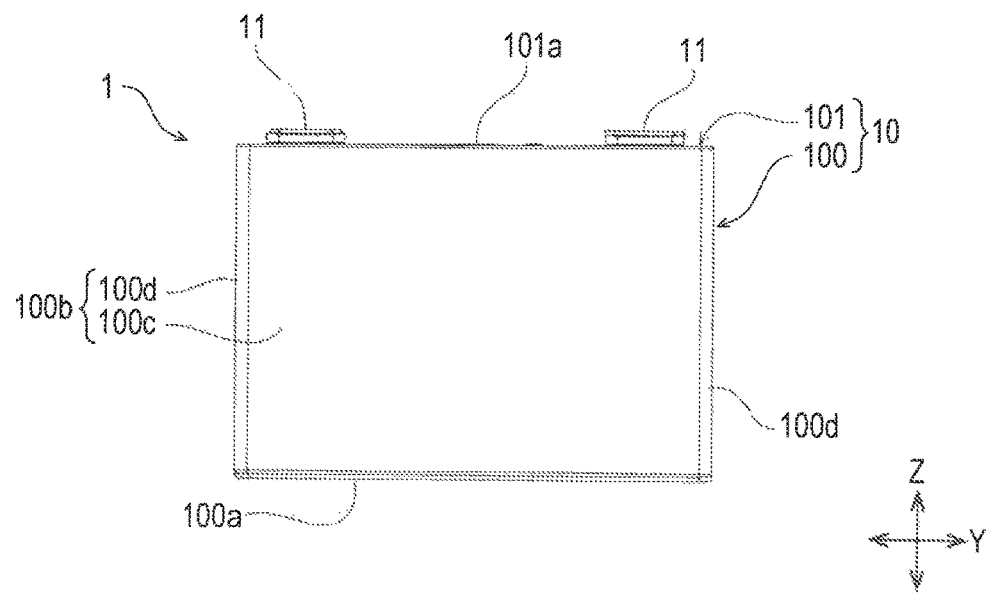
FIG. 3 is a front view of the energy storage device in the energy storage apparatus according to the embodiment.

As shown in FIG. 2 and FIG. 3, the energy storage device 1 includes: an electrode assembly which includes a positive electrode and a negative electrode; a case 10 which houses the electrode assembly; and a pair of external terminals 11 disposed on an outer surface of the case 10.

The case 10 includes: a case body 100 having an opening; and a lid plate 101 which closes the opening of the case body 100 and has an outer surface on which the pair of external terminals 11 is disposed.

The case body 100 includes: a closing portion 100a (see FIG. 3); and a cylindrical barrel portion 100b which is connected to a periphery of the closing portion 100a so as to surround the closing portion 100a.

The barrel portion 100b includes: a pair of first walls 100c which oppositely faces each other with a distance therebetween; and a pair of second walls 100d which oppositely faces each other with the pair of first walls 100c sandwiched therebetween.

The first walls 100c and the second walls 100d are respectively formed into a rectangular shape. That is, surfaces of the first walls 100c and surfaces of the second walls 100d are flat surfaces and respectively have a quadrangular region. The first wall 100c and the second wall 100d are disposed adjacently to each other in a state where respective end edges of the first and second walls 100c, 100d abut each other. Along with such a configuration, the end edge of the first wall 100c and the end edge of the second wall 100d are connected to each other over the entire length. Accordingly, the barrel portion 100b is formed into an angular cylindrical shape. One end of the barrel portion 100b is closed by the closing portion 100a. On the other hand, the other end of the barrel portion 100b is opened. In the case 10, this opening is closed by the lid plate 101.

In this embodiment, a surface area of the first wall 100c is set larger than a surface area of the second wall 100d. Along with such a configuration, the barrel portion 100b is formed into a flat angular cylindrical shape.

The energy storage apparatus according to this embodiment includes the plurality of energy storage devices 1. The plurality of respective energy storage devices 1 are disposed in a row in one direction. In this embodiment, the plurality of respective energy storage devices 1 are disposed in a row in a state where the first walls 100c of the cases 10 are directed in one direction. The energy storage apparatus includes bus bars which electrically connect the external terminals 11 of two energy storage devices 1 disposed adjacently to each other.

In the description made hereinafter, for the sake of convenience, the direction (first direction) along which the energy storage devices 1 are disposed in a row is referred to as the X axis direction. Further, out of two axial directions which are orthogonal to the direction (X axis direction) along which the energy storage devices 1 are disposed in a row and are orthogonal to each other, one direction (second direction) is referred to as the Z axis direction, and the remaining one direction is referred to as the Y axis direction. In accordance with the above, in the respective drawings, three orthogonal axes (coordinate axes) which respectively correspond to the X axis direction, the Y axis direction and the Z axis direction are described complementarily.

The spacers 2 have insulating property. The spacer 2 includes: a base which is disposed adjacently to the case 10 (the first wall 100c of the barrel portion 100b) of the energy storage device 1; and restricting portions which prevent the positional displacement of the energy storage device 1 disposed adjacently to the base.

Figure 4:
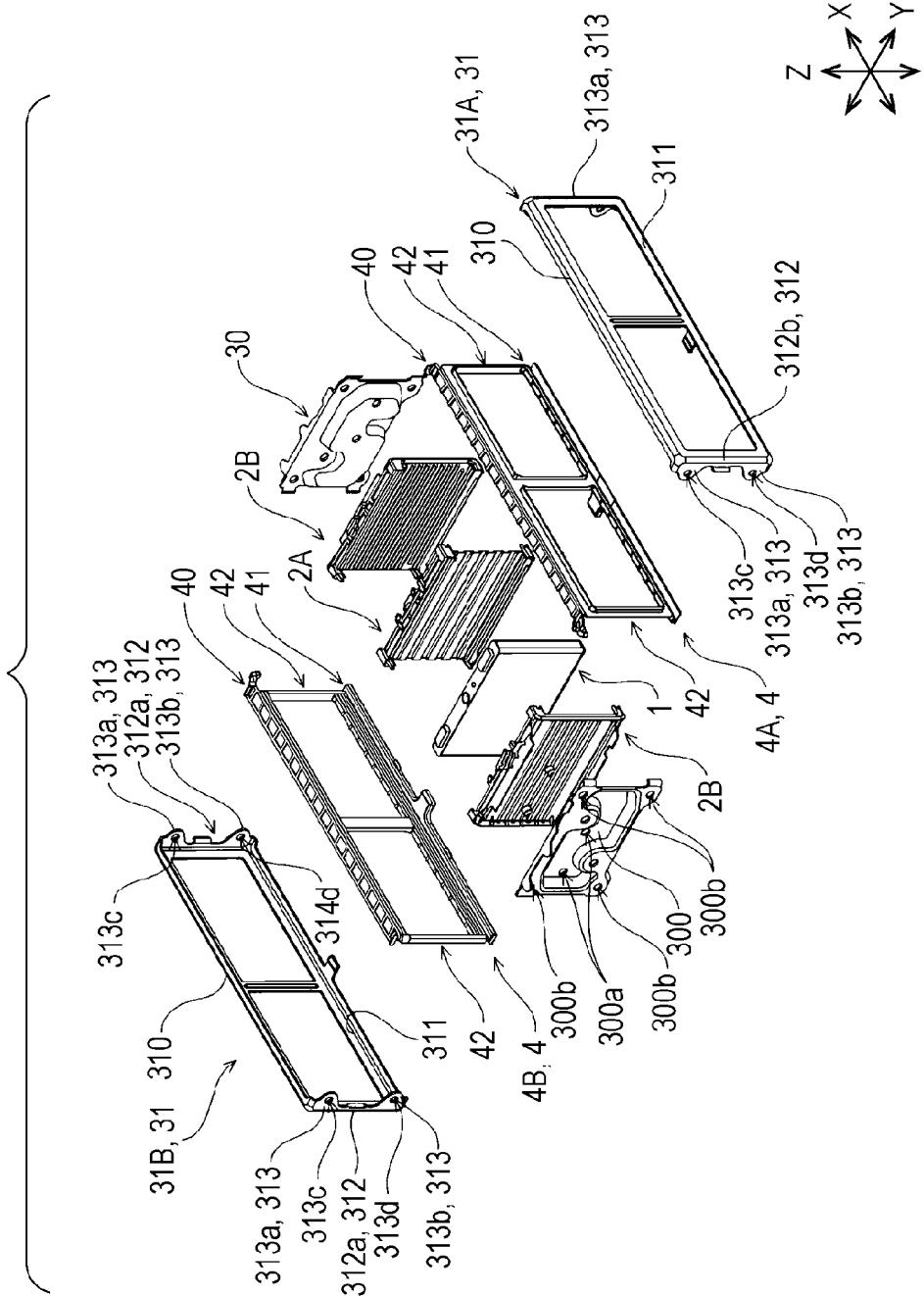
FIG. 4 is an exploded perspective view of the energy storage apparatus according to the embodiment.

The spacer 2 is described more specifically. As described previously, the energy storage apparatus includes the plurality of energy storage devices 1. Along with such a configuration, as shown in FIG. 4, the energy storage apparatus includes two kinds of spacers 2 (2A, 2B). That is, the energy storage apparatus includes, as the spacers 2, spacers 2A each of which is disposed between two energy storage devices 1 (hereinafter referred to as "inner spacers"); and spacers 2B which are disposed adjacently to the energy storage devices 1 disposed at outermost ends out of the plurality of energy storage devices 1 (hereinafter referred to as "outer spacers").

Figure 5:
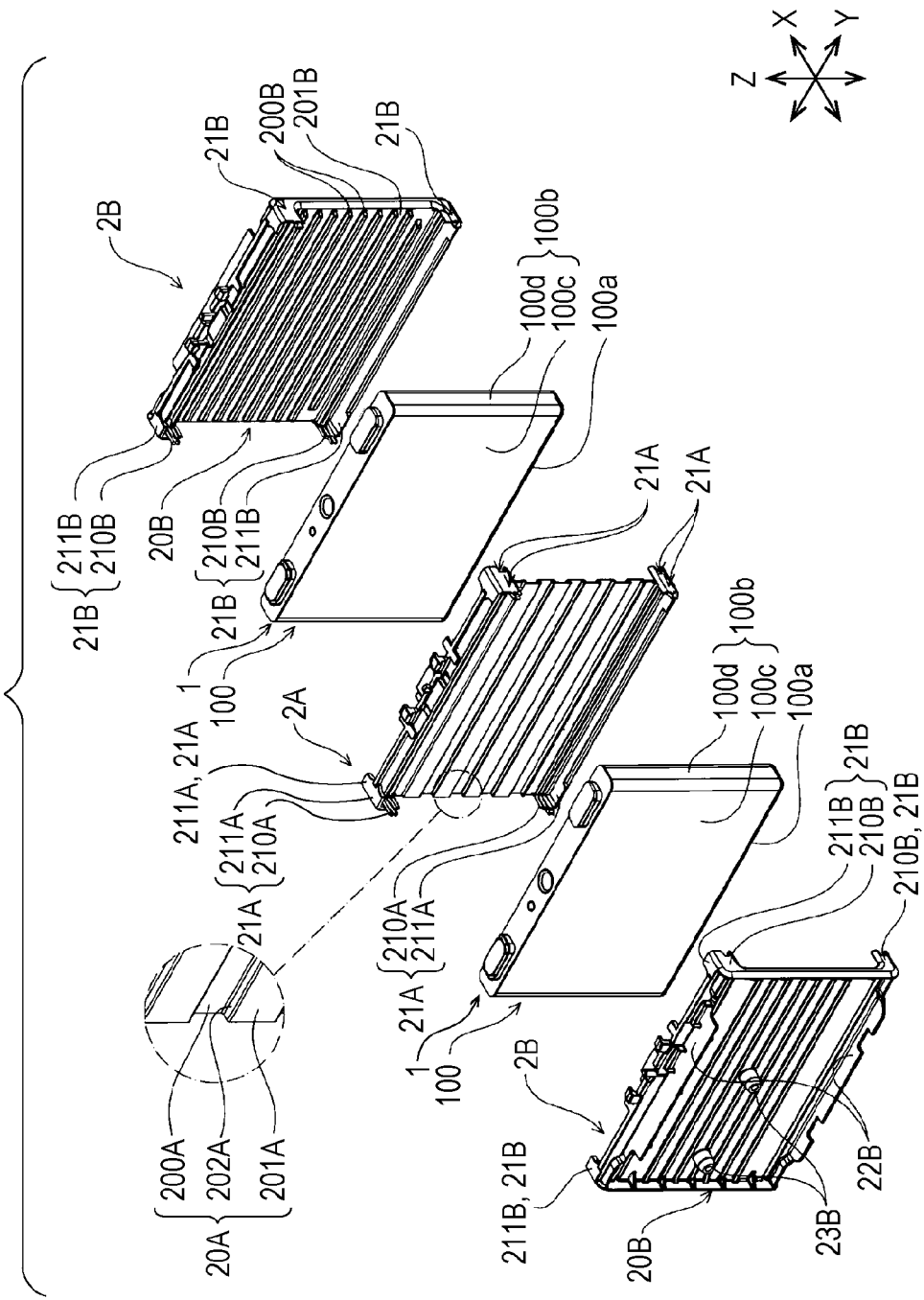
FIG. 5 is a perspective view of inner spacers, outer spacers and the energy storage devices in the energy storage apparatus according to the embodiment.

Firstly, the inner spacer 2A is described. As shown in FIG. 5, the inner spacer 2A includes a base 20A disposed adjacently to the energy storage device 1 (the first wall 100c of the case body 100); and the restricting portions 21A which prevent the positional displacement of two energy storage devices 1 disposed adjacently to the base 20A.

The base 20A of the inner spacer 2A is sandwiched between two energy storage devices 1. Accordingly, the base 20A of the inner spacer 2A has: a first surface which opposedly faces one energy storage device 1 out of two energy storage devices 1 disposed adjacently to the base 20A; and a second surface which is disposed on a side opposite to the first surface and opposedly faces the other energy storage device 1 out of two energy storage devices 1.

The base 20A of the inner spacer 2A has: a first end disposed at the position corresponding to the lid plate 101 of the energy storage device 1; and a second end disposed on a side opposite to the first end at the position corresponding to the closing portion 100a of the energy storage device 1. The base 20A of the inner spacer 2A also has: a third end disposed at the position corresponding to one second wall 100d of the energy storage device 1; and a fourth end disposed on a side opposite to the third end at the position corresponding to the other second wall 100d of the energy storage device 1.

The base 20A of the inner spacer 2A has: a first corner portion where the first end and the third end of the base 20A are connected to each other; and a second corner portion where the first end and the fourth end of the base 20A are connected to each other. The base 20A of the inner spacer 2A also has: a third corner portion where the second end and the third end of the base 20A are connected to each other; and a fourth corner portion where the second end and the fourth end of the base 20A are connected to each other.

The first end and the second end of the base 20A of the inner spacer 2A extend in the Y axis direction. The third end and the fourth end of the base 20A of the inner spacer 2A extend in the Z axis direction. Accordingly, the base 20A of the inner spacer 2A has an approximately rectangular shape. The base 20A of the inner spacer 2A is formed with substantially the same size as the first wall 100c of the energy storage device 1.

In the energy storage apparatus according to this embodiment, ventilation passages which allow a fluid (cooling fluid) to pass therethrough are formed in at least one of between the first surface of the base 20A of the inner spacer 2A and the energy storage device 1 and between the second surface of the base 20A of the inner spacer 2A and the energy storage device 1.

A more specific description follows. The base 20A of the inner spacer 2A is formed into a rectangular corrugated shape. In the energy storage device 1 according to this embodiment, the base 20A of the inner spacer 2A includes: first contact portions 200A which are brought into contact with only one energy storage device 1 out of two energy storage devices 1 disposed adjacently to the base 20A; and second contact portions 201A which are brought into contact with only the other energy storage device 1 out of two energy storage devices 1 disposed adjacently to the base 20A. Along with such a configuration, the base 20A of the inner spacer 2A includes connecting portions 202A each of which is connected to the first contact portion 200A and the second contact portion 201A.

The first contact portion 200A is elongated in the Y axis direction. The second contact portion 201A is elongated in the Y axis direction.

The base 20A of the inner spacer 2A includes a plurality of first contact portions 200A and a plurality of second contact portions 201A. The respective first contact portions 200A and the respective second contact portions 201A are alternately disposed in the direction along which the first end and the second end of the base 20A of the inner spacer 2A are juxtaposed with each other.

Figure 6:
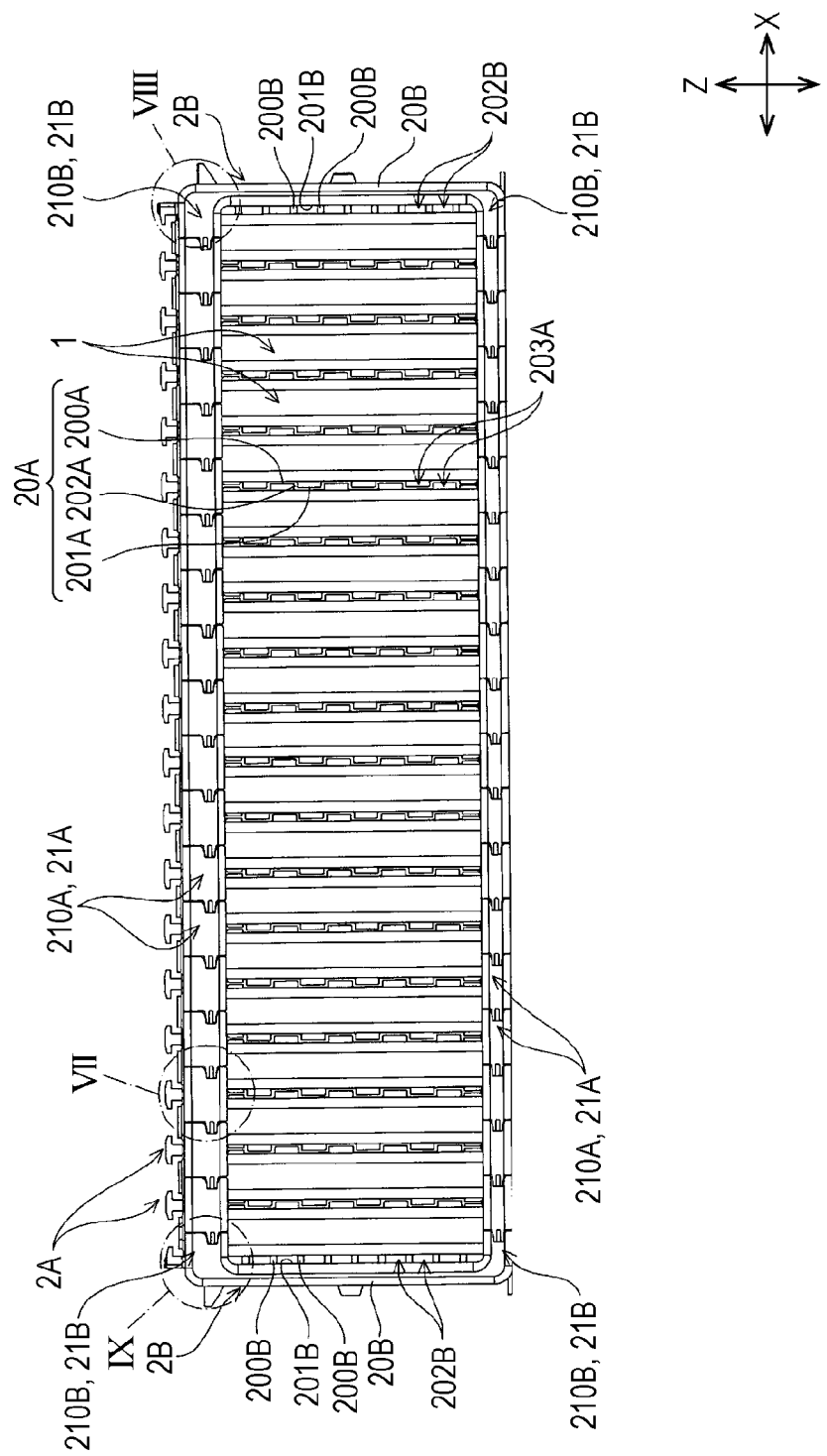
FIG. 6 is a side view of the energy storage devices and the spacers of the energy storage apparatus according to the embodiment.

With such a configuration, as shown in FIG. 6, in the energy storage apparatus, the ventilation passage 203A is formed by a surface of the first contact portion 200A on a side opposite to a surface which is brought into contact with the energy storage device 1 and the pair of connecting portions 202A which is connected to the first contact portion 200A. In the energy storage apparatus, the ventilation passage 203A is formed by a surface of the second contact portion 201A on a side opposite to a surface which is brought into contact with the energy storage device 1 and the pair of connecting portions 202A which is connected to the second contact portion 201A. Accordingly, in the energy storage apparatus, the ventilation passages 203A which allow cooling air to pass therethrough are formed between the first surface of the base 20A of the inner spacer 2A and the energy storage device 1 and between the second surface of the base 20A of the inner spacer 2A and the energy storage device 1.

As described previously, the inner spacer 2A is disposed between two energy storage devices 1 which are disposed adjacently to each other. Accordingly, to restrict the relative movement between two energy storage devices 1 disposed adjacently to the inner spacer 2A, the inner spacer 2A includes the restricting portions 21A extending toward the energy storage device 1 disposed adjacently to the first surface of the base 20A of the inner spacer 2A and the restricting portions 21A extending toward the energy storage device 1 disposed adjacently to the second surface of the base 20A of the inner spacer 2A.

A more specific description follows. As shown in FIG. 5, the restricting portion 21A is formed on respective corner portions of the base 20A of the inner spacer 2A.

Each restricting portion 21A includes: a first restricting member 210A which is connected to an outer edge of the base 20A extending in the Z axis direction and extends in the X axis direction from the base 20; and a second restricting member 211A which is connected to an outer edge of the base 20A extending in the Y axis direction and extends in the X axis direction from the base 20A.

The first restricting member 210A of the restricting portion 21A which is formed on the first corner portion is connected to the third end of the base 20A. The second restricting member 211A of the restricting portion 21A which is formed on the first corner portion is connected to the first end of the base 20A.

The first restricting member 210A of the restricting portion 21A which is formed on the second corner portion is connected to the fourth end of the base 20A. The second restricting member 211A of the restricting portion 21A which is formed on the second corner portion is connected to the first end of the base 20A.

The first restricting member 210A of the restricting portion 21A which is formed on the third corner portion is connected to the third end of the base 20A. The second restricting member 211A of the restricting portion 21A which is formed on the third corner portion is connected to the second end of the base 20A.

The first restricting member 210A of the restricting portion 21A which is formed on the fourth corner portion is connected to the fourth end of the base 20A. The second restricting member 211A of the restricting portion 21A which is formed on the fourth corner portion is connected to the second end of the base 20A.

As described previously, the inner spacer 2A includes the restricting portions 21A which extend toward the energy storage device 1 disposed adjacently to the first surface of the base 20A, and the restricting portions 21A which extend toward the energy storage device 1 disposed adjacently to the second surface of the base 20A of the inner spacer 2A. Accordingly, in each inner spacer 2A, the first restricting members 210A of the pair of restricting portions 21A respectively form opposedly facing portions which opposedly face the spacers 2 on both sides of the inner spacer 2A in the X axis direction.

The opposedly facing portion 210A is disposed at a position facing the ventilation passage 203A and being disposed adjacently to the energy storage device 1 in the flow direction of cooling air in the ventilation passage 203A. Further, the opposedly facing portions 210A are disposed in a row in the X axis direction.

Figure 7:
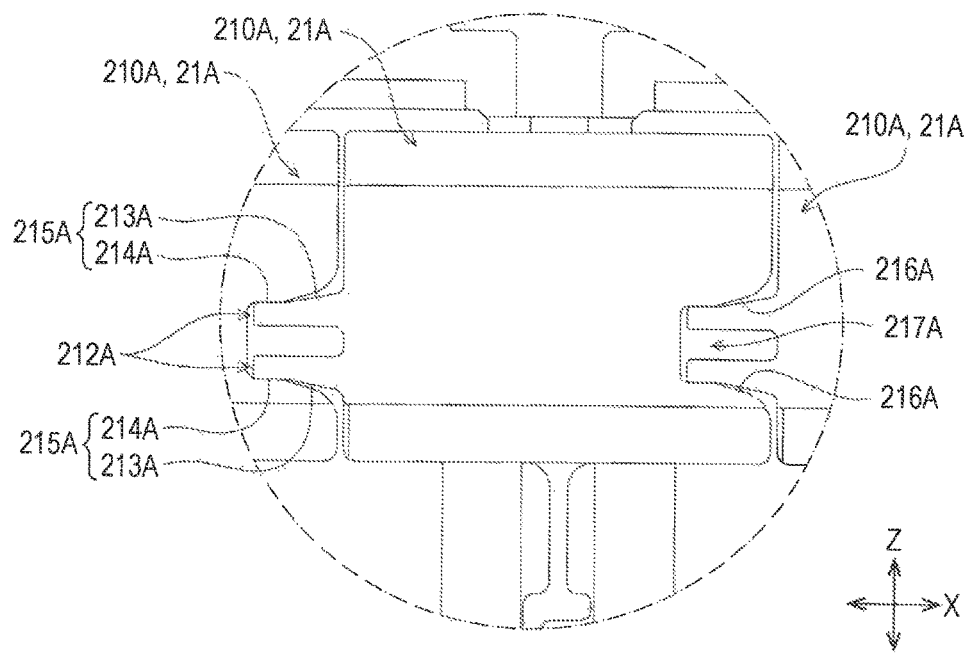
FIG. 7 is an enlarged view of a region VII in FIG. 6 of the energy storage apparatus according to the embodiment.

As shown in FIG. 7, in one inner spacer 2A, each opposedly facing portion 210A is brought into contact with the corresponding opposedly facing portion 210A of another inner spacer 2A which is disposed adjacently to one inner spacer 2A on one side in the X axis direction with the energy storage device 1 sandwiched therebetween.

A more specific description follows. One opposedly facing portion 210A has extending portions 212A which extend from one opposedly facing portion 210A toward one side in the X axis direction. Another opposedly facing portion 210A has inclined surfaces 216A which are formed on another opposedly facing portion 210A and are brought into contact with the extending portions 212A of one opposedly facing portion 210A disposed adjacently to another opposedly facing portion 210A on the other side in the X axis direction.

The extending portions 212A of one opposedly facing portion 210A are brought into contact with the inclined surfaces 216A of another opposedly facing portion 210A which is disposed adjacently to one opposedly facing portion 210A on one side in the X axis direction. The extending portions 212A of one opposedly facing portion 210A have surfaces which are brought into contact with at least portions of the inclined surfaces 216A of another opposedly facing portion 210A which is disposed adjacently to one opposedly facing portion 210A on one side in the X axis direction.

According to this embodiment, the extending portion 212A of one opposedly facing portion 210A has an inclined surface 213A which opposedly faces, in the Z axis direction, the inclined surface 216A of another opposedly facing portion 210A which is disposed adjacently to one opposedly facing portion 210A on one side in the X axis direction. Further, the extending portion 212A has an extending surface 214A which extends straightly in the X axis direction from the inclined surface 213A.

The inclined surface 213A is a surface which is inclined with respect to the X axis direction as well as with respect to the Z axis direction. The extending surface 214A is a surface which extends in the X axis direction as well as in the Y axis direction.

Accordingly, in the extending portion 212A of one opposedly facing portion 210A, a surface which is brought into contact with at least a portion of the inclined surface 216A of another opposedly facing portion 210A which is disposed adjacently to one opposedly facing portion 210A in the X axis direction is bent at an intermediate position thereof in the X axis direction. In this embodiment, there may be a case where the description is made by naming a surface including the inclined surface 213A and the extending surface 214A as a contact surface 215A hereinafter.

Further, in the opposedly facing portion 210A in this embodiment, the pair of extending portions 212A is disposed in a spaced-apart manner in the Z axis direction. The pair of extending portions 212A is disposed such that the respective contact surfaces 215A are directed in opposite directions in the Z axis direction. The pair of extending portions 212A has elasticity respectively.

The inclined surfaces 216A of the opposedly facing portion 210A are inclined with respect to the X axis direction as well as with respect to the Z axis direction (with respect to the direction orthogonal to the direction that the pair of opposedly facing portions 210A opposedly faces each other as well as with respect to the flow direction of cooling air). That is, the inclined surfaces 216A of the opposedly facing portion 210A are formed so as to be inclined with respect to a plane extending in the X axis direction as well as in the Y axis direction and, at the same time, to extend straightly in the Y axis direction.

The inclined surfaces 216A according to this embodiment are formed on another first restricting member 210A and are formed of portions of the recessed portion 217A opening toward another opposedly facing portion 210A which is disposed adjacently to one opposedly facing portion 210A in the X axis direction. Accordingly, the opposedly facing portion 210A has the pair of inclined surfaces 216A which opposedly faces each other in the Z axis direction with a distance therebetween.

The pair of inclined surfaces 216A is disposed at a position where the pair of inclined surfaces 216A is juxtaposed with the pair of extending portions 212A in the X axis direction respectively.

The pair of inclined surfaces 216A is formed such that a distance between the pair of inclined surfaces 216A is gradually decreased as the pair of inclined surfaces 216A extends away from the neighboring another opposedly facing portion 210A in the X axis direction.

In the opposedly facing portion 210A, portions of the respective inclined surfaces 216A on an opening side of the recessed portion 217A are disposed such that a distance between the portions of the respective inclined surfaces 216A becomes larger than a distance between distal end portions of the pair of extending portions 212A (a distance between the contact surfaces 215A).

In the opposedly facing portion 210A, portions of the pair of inclined surfaces 216A on a side of a bottom surface of the recessed portion 217A are disposed such that a distance between the portions of the pair of inclined surfaces 216A becomes smaller than a distance between end portions of the pair of extending portions 212A on a distal end side (a distance between the contact surfaces 215A).

Next, the outer spacer 2B is described. As shown in FIG. 5, the outer spacer 2B includes: a base 20B having a first surface which opposely faces the energy storage device 1 (the first wall 100c of the case body 100) and a second surface which is disposed on a side opposite to the first surface (hereinafter referred to as "base 20B"); and restricting portions 21B which determine the position of the energy storage device 1 disposed adjacently to the base 20B (hereinafter referred to as "restricting portions 21B").

In the outer spacer 2B in this embodiment, the base 20B and an end plate 30 described later of the holder 3 opposely face each other. That is, the outer spacer 2B is disposed between the energy storage device 1 and the end plate 30 (see FIG. 4).

With such a configuration, the outer spacer 2B includes fitting portions 22B which are fitted on the end plate 30 at a position where the base 20B opposely faces the end plate 30. That is, the outer spacer 2B includes the fitting portions 22B which determine the position of the end plate 30 with respect to the base 20B, and are formed on the second surface of the base 20B. Further, the outer spacer 2B includes a shaft portion 23B which determines the position of the end plate 30 with respect to the base 20B and projects from the second surface of the base 20B.

The base 20B of the outer spacer 2B extends in the Y axis direction as well as in the Z axis direction. That is, the base 20B is formed into a plate shape. The base 20B of the outer spacer 2B has: a first end disposed at the position corresponding to the lid plate 101 of the energy storage device 1; and a second end disposed on a side opposite to the first end at the position corresponding to the closing portion 100a of the energy storage device 1. The base 20B of the outer spacer 2B also has a third end disposed at the position corresponding to the second wall 100d on one side of the energy storage device 1; and a fourth end disposed on a side opposite to the third end at the position corresponding to the second wall 100d on the other side of the energy storage device 1.

The base 20B of the outer spacer 2B has: a first corner portion where the first end and the third end are connected to each other; and a second corner portion where the first end and the fourth end are connected to each other. The base 20B of the outer spacer 2B also has: a third corner portion where the second end and the third end are connected to each other; and a fourth corner portion where the second end and the fourth end are connected to each other.

The first end and the second end of the base 20B of the outer spacer 2B extend in the Y axis direction. The third end and the fourth end of the base 20B of the outer spacer 2B extend in the direction orthogonal to the Z axis direction. Accordingly, the base 20B of the outer spacer 2B has an approximately rectangular shape. The base 20B of the outer spacer 2B has a size substantially equal to a size of the first wall 100c of the energy storage device 1.

Ventilation passages which allow a fluid to pass through between a first surface of the base 20B and the energy storage device 1 are formed on the first surface of the base 20B of the outer spacer 2B.

A more specific description follows. The outer spacer 2B includes projecting portions 200B which project toward the energy storage device 1 from the first surface of the base 20B and are brought into contact with the energy storage device 1 (hereinafter, referred to as inner contact portions 200B). The inner contact portions 200B extend toward the case 10 of the energy storage device 1 (the first wall 100c of the case body 100) from the first surface of the base 20B.

The inner contact portions 200B are elongated in the Y axis direction. As shown in FIG. 6, the base 20B of the outer spacer 2B in this embodiment includes the plurality of inner contact portions 200B. The plurality of respective inner contact portions 200B are disposed at intervals in the direction orthogonal to the longitudinal direction of the inner contact portions 200B. Along with such a configuration, the base 20B of the outer spacer 2B includes connecting portions 201B each of which is connected to the projecting portion 200B disposed adjacently to each other in the Z axis direction. With such a configuration, a plurality of ventilation passages 202B which allow cooling air to pass therethrough are formed between the base 20B of the outer spacer 2B and the energy storage device 1.

As described previously, the first surface of the outer spacer 2B is disposed adjacently to the energy storage device 1. Accordingly, to restrict the relative movement between the outer spacer 2B and the energy storage device 1 disposed adjacently to the first surface of the outer spacer 2B, the outer spacer 2B includes the restricting portions 21B which extend toward the energy storage device 1 disposed adjacently to the first surface of the base 20B of the outer spacer 2B.

A more specific description follows. As shown in FIG. 5, the restricting portion 21B is formed on respective corner portions of the base 20B of the outer spacer 2B.

Each restricting portion 21B includes: a first restricting member 210B which is connected to an outer edge of the base 20B extending in the Z axis direction and extends in the X axis direction from the base 20; and a second restricting member 211B which is connected to the base 20B in the Y axis direction and extends in the X axis direction from the base 20B.

The first restricting member 210B of the restricting portion 21B which is formed on the first corner portion is connected to the third end of the base 20B. The second restricting member 211B of the restricting portion 21B which is formed on the first corner portion is connected to the first end of the base 20B.

The first restricting member 210B of the restricting portion 21B which is formed on the second corner portion is connected to the fourth end of the base 20B. The second restricting member 211B of the restricting portion 21B which is formed on the second corner portion is connected to the first end of the base 20B.

The first restricting member 210B of the restricting portion 21B which is formed on the third corner portion is connected to the third end of the base 20B. The second restricting member 211B of the restricting portion 21B which is formed on the third corner portion is connected to the second end of the base 20B.

The first restricting member 210B of the restricting portion 21B which is formed on the fourth corner portion is connected to the fourth end of the base 20B. The second restricting member 211B of the restricting portion 21B which is formed on the fourth corner portion is connected to the second end of the base 20B.

As described previously, the outer spacer 2B includes the restricting portions 21B which extend toward the energy storage device 1 disposed adjacently to the first surface of the base 20B. Accordingly, in the outer spacer 2B, each first restricting member 210B of the restricting portion 21B forms an opposedly facing portion 210B which opposedly faces the opposedly facing portion 210A of the inner spacer 2A which is disposed adjacently to the outer spacer 2B in the X axis direction.

The opposedly facing portions 210B of the outer spacer 2B are disposed at positions facing the ventilation passages 202B and are disposed adjacently to the energy storage device 1 in the flow direction of cooling air in the ventilation passage 202B. Further, the opposedly facing portions 210B of the outer spacer 2B are disposed in a row with the opposedly facing portions 210A of the respective inner spacers 2A in the X axis direction.

As shown in FIG. 6, with respect to the outer spacer 2B, the opposedly facing portion 210B of the outer spacer 2B is brought into contact with the opposedly facing portion 210A of the inner spacer 2A disposed adjacently to the opposedly facing portion 210B with the energy storage device 1 sandwiched therebetween in the X direction.

As described previously, the outer spacer 2B in this embodiment is disposed adjacently to the inner spacer 2A with the energy storage device 1 sandwiched therebetween. That is, the energy storage apparatus includes the pair of outer spacers 2B.

Figure 8:
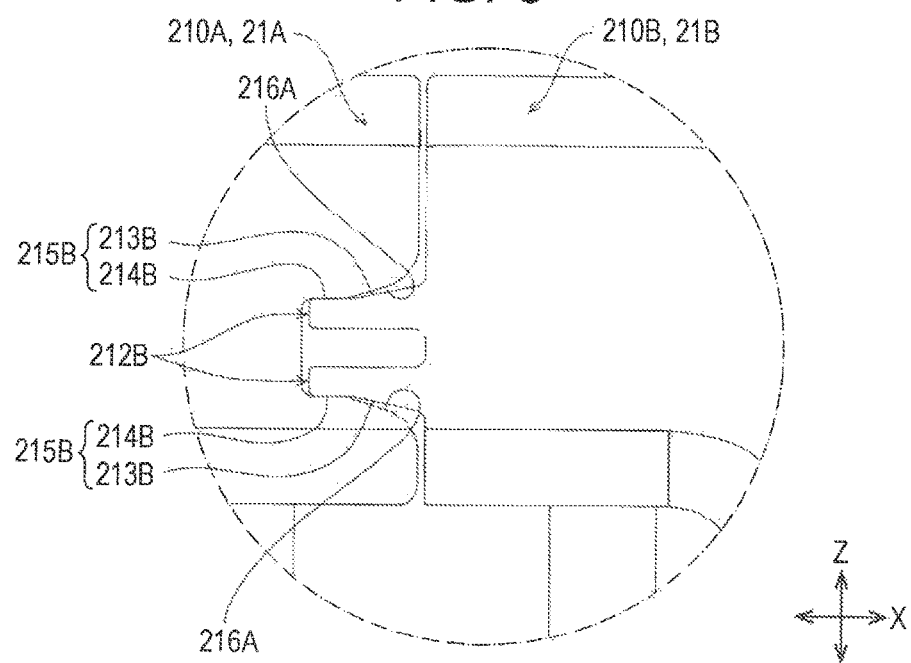
FIG. 8 is an enlarged view of a region VIII in FIG. 6 of the energy storage apparatus according to the embodiment.

Accordingly, as shown in FIG. 8, the opposedly facing portion 210B of one of the outer spacers 2B has extending portions 212B which extend toward one side in the X axis direction from the first restricting member 210B.

The extending portions 212B are brought into contact with the inclined surfaces 216A of the opposedly facing portion 210A of the inner spacer 2A disposed adjacently to the outer spacer 2B in the X axis direction respectively. Accordingly, the extending portion 212B has surfaces which are brought into contact with at least portions of the inclined surfaces 216A of the opposedly facing portion 210A of the inner spacer 2A which is disposed adjacently to the outer spacer 2B in the X axis direction.

The extending portion 212B according to this embodiment has an inclined surface 213B which opposedly faces, in the Z axis direction, the inclined surface 216A of the opposedly facing portion 210A of the inner spacer 2A disposed adjacently to the outer spacer 2B in the X axis direction. Further, the extending portion 212B has an extending surface 214B which extends straightly in the X axis direction from the inclined surface 213B.

The inclined surface 213B is a surface inclined with respect to the X axis direction as well as with respect to the Z axis direction. The extending surface 214B is a surface which extends in the X axis direction as well as in the Y axis direction.

Accordingly, in the extending portion 212B of the opposedly facing portion 210B, a surface which is brought into contact with at least a portion of the inclined surface 216A of the opposedly facing portion 210A of the inner spacer 2A which is disposed adjacently to the outer spacer 2B in the X axis direction is bent at an intermediate position thereof in the X axis direction. In this embodiment, there may be a case where the description is made by naming a surface including the inclined surface 213B and the extending surface 214B as a contact surface 215B hereinafter.

Further, in this embodiment, in the opposedly facing portion 210B of the outer spacer 2B, the pair of extending portions 212B is disposed in a spaced-apart manner in the Z axis direction. The pair of extending portions 212B is disposed such that the respective contact surfaces 215B are directed in opposite directions in the Z axis direction. The pair of extending portions 212B has elasticity respectively.

Figure 9:
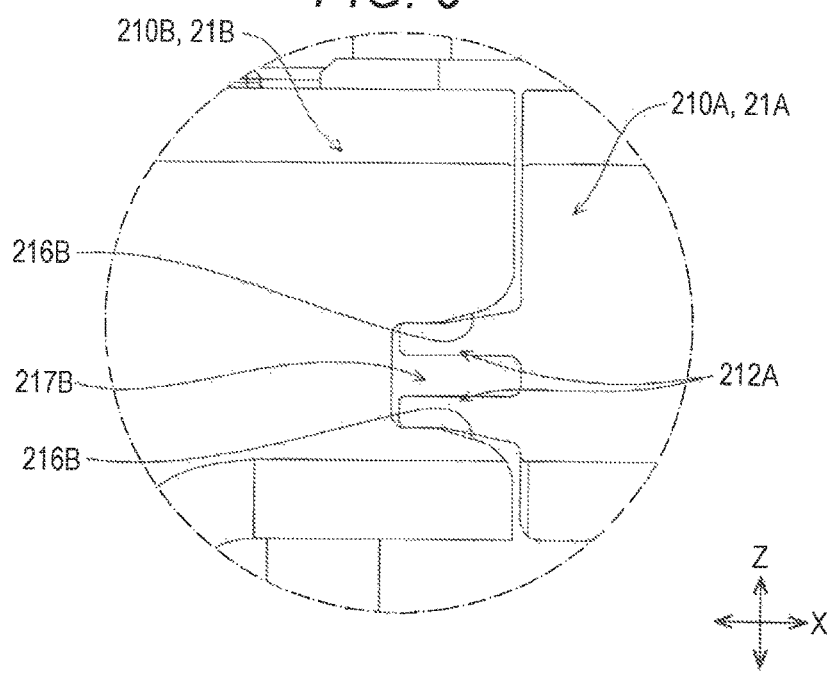
FIG. 9 is an enlarged view of a region IX in FIG. 6 of the energy storage apparatus according to the embodiment.

As shown in FIG. 9, the opposedly facing portion 210B of the other outer spacer 2B has inclined surfaces 216B which are brought into contact with the extending portions 212A of the opposedly facing portion 210A of the inner spacer 2A disposed adjacently to the other outer spacer 2B on the other side in the X axis direction and are inclined with respect to the X axis direction as well as with respect to the Z axis direction (with respect to a direction orthogonal to the direction that the opposedly facing portion 210B of the other outer spacer 2B and the opposedly facing portion 210A of the inner spacer 2A opposedly face each other and to the flow direction of cooling air).

The inclined surfaces 216B of the opposedly facing portion 210B of the other outer spacer 2B are inclined with respect to the X axis direction as well as with respect to the Z axis direction as described previously. That is, the inclined surfaces 216B of the opposedly facing portion 210B of the other outer spacer 2B are formed so as to be inclined with respect to a plane extending in the X axis direction as well as in the Y axis direction and, at the same time, to extend straightly in the Y axis direction.

The inclined surfaces 216B according to this embodiment are formed on the first restricting member 210B and are formed of portions of the recessed portion 217B opening toward the opposedly facing portion 210A of the inner spacer 2A which is disposed adjacently to the other outer spacer 2B in the X axis direction. Accordingly, the opposedly facing portion 210B of the other outer spacer 2B has the pair of inclined surfaces 216B which opposedly faces each other in the Z axis direction with a distance therebetween.

The pair of inclined surfaces 216B is disposed at a position where the pair of inclined surfaces 216B is juxtaposed with the pair of extending portions 212A of the inner spacer 2A in the X axis direction respectively.

The pair of inclined surfaces 216B is formed such that a distance between the pair of inclined surfaces 216B is gradually decreased as the pair of inclined surfaces 216B extends away from the opposedly facing portion 210A of the inner spacer 2A disposed adjacently to the other outer spacer 2B in the X axis direction.

In the opposedly facing portion 210B of the other outer spacer 2B, portions of the respective inclined surfaces 216B on an opening side of the recessed portion 217B are disposed such that a distance between the portions of the respective inclined surfaces 216B becomes larger than a distance between distal end portions of the pair of extending portions 212A of the inner spacer 2A (a distance between the contact surfaces 215A).

In the opposedly facing portion 210B of the other outer spacer 2B, portions of the pair of inclined surfaces 216B on a side of a bottom surface of the recessed portion 217B are disposed such that a distance between the portions of the pair of inclined surfaces 216B becomes smaller than a distance between end portions of the pair of extending portions 212A of the inner spacer 2A on a distal end side (a distance between the contact surfaces 215A).

In this embodiment, the holder 3 is made of metal. As shown in FIG. 4, the holder 3 includes: a pair of end plates 30 which is disposed at positions where the end plates 30 are disposed adjacently to the respective outer spacers 2B; and a frame 31 which connects the pair of end plates 30 to each other.

Each of the pair of end plates 30 has a first surface which opposedly faces the outer spacer 2B and a second surface which is disposed on a side opposite to the first surface. Each of the pair of end plates 30 has a pressure contact portion 300 which is brought into contact with the base 20B of the outer spacer 2B.

Each end plate 30 has: a first end disposed at a position corresponding to the lid plate 101 of the energy storage device 1; and a second end disposed on a side opposite to the first end (the second end disposed at a position corresponding to the closing portion 100a of the energy storage device 1). The end plate 30 also has: a third end disposed at a position corresponding to the second wall 100d on one side of the energy storage device 1; and a fourth end disposed on a side opposite to the third end (the fourth end disposed at a position corresponding to the second wall 100d on the other side of the energy storage device 1).

Along with such a configuration, each end plate 30 has a first corner portion where the first end and the third end are connected to each other; and a second corner portion where the first end and the fourth end are connected to each other. The end plate 30 also has: a third corner portion where the second end and the third end are connected to each other; and a fourth corner portion where the second end and the fourth end are connected to each other.

The pressure contact portion 300 has insertion holes 300a which are formed at positions corresponding to the shaft portions 23B of the outer spacer 2B. Further, the pressure contact portion 300 also has a plurality of (four in this embodiment) through holes 300b which are formed in the respective corner portions.

The frame 31 has: a first connecting portion 310 which extends between the pair of end plates 30 and is disposed at the position corresponding to the lid plate 101 of the energy storage device 1; and a second connecting portion 311 which extends between the pair of end plates 30 and is disposed at the position corresponding to the closing portion 100a of the energy storage device 1.

The frame 31 also has support portions 312 which are connected to the first connecting portion 310 and the second connecting portion 311.

In this embodiment, the frame 31 having a frame body shape is formed by connecting the first connecting portion 310 and the second connecting portion 311 to each other by the support portions 312. Along with such a configuration, hereinafter, the energy storage apparatus according to this embodiment may be also described by naming a member which includes the first connecting portion 310, the second connecting portion 311 and the support portions 312 which are disposed on one side of the energy storage devices in the direction orthogonal to the X axis direction (hereinafter referred to as "Y axis direction") as a first frame 31A, and by naming a member which includes the first connecting portion 310, the second connecting portion 311 and the support portions 312 which are disposed on the other side of the energy storage devices in the Y axis direction as a second frame 31B.

The frame 31 has fixing portions 313 connected to the end plates 30.

The first connecting portion 310 has a first end and a second end disposed on a side opposite to the first end in the longitudinal direction.

The first connecting portion 310 is bent in the direction orthogonal to the longitudinal direction. A portion of the first connecting portion 310 disposed on one side of a bent portion which forms a boundary is disposed at a position corresponding to the lid plates 101 of the energy storage devices 1. A portion of the first connecting portion 310 disposed on the other side of the bent portion which forms the boundary is disposed at a position corresponding to the second walls 100d of the energy storage devices 1.

The second connecting portion 311 has a first end and a second end disposed on a side opposite to the first end in the longitudinal direction.

The second connecting portion 311 is bent in the direction orthogonal to the longitudinal direction. A portion of the second connecting portion 311 disposed on one side of a bent portion which forms a boundary is disposed at a position corresponding to the closing portions 100a of the energy storage devices 1, and a portion of the second connecting portion 311 disposed on the other side of the bent portion which forms the boundary is disposed at a position corresponding to the second walls 100d of the energy storage devices 1.

The support portion 312 includes: a first support portion 312a which is connected to the first end of the first connecting portion 310 and the first end of the second connecting portion 311; and a second support portion 312b which is connected to the second end of the first connecting portion 310 and the second end of the second connecting portion 311.

The fixing portion 313 includes: a pair of first fixing portions 313a which is formed at the first end and the second end of the first connecting portion 310 respectively; and a pair of second fixing portions 313b which is formed at the first end and the second end of the second connecting portion 311 respectively.

One first fixing portion 313a opposedly faces the through hole 300b formed in one end plate 30 and a portion around the through hole 300b. The other first fixing portion 313a opposedly faces the through hole 300b formed in the other end plate 30 and a portion around the through hole 300b. A first hole portion 313c is formed in the pair of first fixing portions 313a respectively at positions corresponding to the through holes 300b.

With such a configuration, the first connecting portion 310 is connected to the end plates 30 by threadedly engaging nuts with bolts which are inserted into the through holes 300b formed in the end plates 30 and the first hole portions 313c formed in the first fixing portions 313a.

One second fixing portion 313b opposedly faces the through hole 300b formed in one end plate 30 and a portion around the through hole 300b. The other second fixing portion 313b opposedly faces the through hole 300b formed in the other end plate 30 and a portion around the through hole 300b. A second hole portion 313d is formed in the pair of second fixing portions 313b respectively at positions corresponding to the through holes 300b.

Accordingly, the second connecting portion 311 is connected to the end plates 30 by threadedly engaging nuts with bolts which are inserted into the through holes 300b formed in the end plates 30 and the second hole portions 313d formed in the second fixing portions 313b.

The insulator 4 is made of a material having insulation property. The insulator 4 includes: a pair of first insulating portions 40 which is disposed between the pair of first connecting portions 310 and the spacers 2 (the inner spacers 2A and the outer spacers 2B) respectively; and a pair of second insulating portions 41 which is disposed between the pair of second connecting portions 311 and the spacers 2 (the inner spacers 2A and the outer spacers 2B) respectively.

The first insulating portion 40 is elongated in the X axis direction. The first insulating portion 40 is disposed between the energy storage devices 1 and the first connecting portion 310 of the frame 31. That is, the first insulating portion 40 is bent in a direction orthogonal to the longitudinal direction thereof. A portion of the first insulating portion 40 disposed on one side of the bent portion of the first insulating portion 40 which forms the boundary is brought into contact with the portion of the first connecting portion 310 disposed on one side of the bent portion of the first connecting portion 310 which forms the boundary. A portion of the first insulating portion 40 disposed on the other side of the bent portion of the first insulating portion 40 which forms the boundary is brought into contact with the portion of the first connecting portion 310 disposed on the other side of the bent portion of the first connecting portion 310 which forms the boundary.

The second insulating portion 41 is elongated in the X axis direction. The second insulating portion 41 is disposed between the energy storage devices 1 and the second connecting portion 311 of the frame 31. That is, the second insulating portion 41 is bent in a direction orthogonal to the longitudinal direction thereof. A portion of the second insulating portion 41 disposed on one side of the bent portion of the second insulating portion 41 which forms the boundary is brought into contact with the portion of the second connecting portion 311 disposed on one side of the bent portion of the second connecting portion 311 which forms the boundary. A portion of the second insulating portion 41 disposed on the other side of the bent portion of the second insulating portion 41 which forms the boundary is brought into contact with the portion of the second connecting portion 311 disposed on the other side of the bent portion of the second connecting portion 311 which forms the boundary.

The insulator 4 according to this embodiment has two third insulating portions 42. A more specific description follows. In the insulator 4, a first end of the first insulating portion 40 and a first end of the second insulating portion 41 are connected to each other by the third insulating portion 42, and a second end of the first insulating portion 40 and a second end of the second insulating portion 41 are connected to each other by the third insulating portion 42.

As has been described heretofore, in the energy storage apparatus according to this embodiment, the extending portions 212A of the oppositely facing portion 210A of the inner spacer 2A extend to the oppositely facing portion 210A of another inner spacer 2A which is disposed adjacently to the inner spacer 2A in the X axis direction or to the oppositely facing portion 210B of the outer spacer 2B which is disposed adjacently to the inner spacer 2A in the X axis direction. Accordingly, the extending portions 212A of the inner spacer 2A are brought into contact with the oppositely facing portion 210A of another inner spacer 2A which is disposed adjacently to the inner spacer 2A in the X axis direction or with the oppositely facing portion 210B of the outer spacer 2B which is disposed adjacently to the inner spacer 2A in the X axis direction.

The extending portions 212B of the oppositely facing portion 210B of the outer spacer 2B extend to the oppositely facing portion 210A of the inner spacer 2A which is disposed adjacently to the outer spacer 2B in the X axis direction. Accordingly, the extending portions 212B of the oppositely facing portion 210B of the outer spacer 2B are brought into contact with the oppositely facing portion 210A of the inner spacer 2A which is disposed adjacently to the outer spacer 2B in the X axis direction.

With such a configuration, in the energy storage apparatus, cooling air which intends to flow through between the oppositely facing portions 210A of the inner spacers 2A which are disposed adjacently to each other in the X axis direction and between the oppositely facing portion 210A of the inner spacer 2A and the oppositely facing portion 210B of the outer spacer 2B which are disposed adjacently to each other in the X axis direction is blocked by the extending portions 212A of the oppositely facing portions 210A of the inner spacers 2A and the extending portions 212B of the oppositely facing portion 210B of the outer spacer 2B.

Accordingly, in the energy storage apparatus, it is possible to obstruct the flow of air from the end edges of the oppositely facing portions 210A of the respective spacers 2 on a ventilation passage 203A, 202B side toward the end edges of the oppositely facing portions 210A of the respective spacers 2 on a side opposite to the ventilation passages 203A, 202B side. With such a configuration, in the energy storage apparatus, it is possible to make cooling air which is supplied to the ventilation passages 203A, 202B formed between the respective energy storage devices 1 minimally leaked to the outside.

In the energy storage apparatus according to this embodiment, a portion where the extending portion 212A of the inner spacer 2A and the inclined surface 216A of another inner spacer 2A are brought into contact with each other and a portion where the extending portion 212A of the inner spacer 2A and the inclined surface 216B of the outer spacer 2B are brought into contact with each other are respectively inclined with respect to the Z axis direction.

Accordingly, in the energy storage apparatus, it is possible to more effectively obstruct the flow of air from the end edges of the oppositely facing portions 210A of the respective spacers 2 on a ventilation passage 203A, 202B side toward the end edges of the oppositely facing portions 210A of the respective spacers 2 on a side opposite to the ventilation passage 203A, 202B side.

The extending portions 212A of the oppositely facing portion 210A of the inner spacer 2A and the extending portions 212B of the oppositely facing portion 210B of the outer spacer 2B respectively have elasticity. Accordingly, in the energy storage apparatus, even when the distance between the oppositely facing portions 210A of the inner spacers 2A is narrowed or the distance between the oppositely facing portion 210A of the inner spacer 2A and the oppositely facing portion 210B of the outer spacer 2B is narrowed due to an error in manufacture or the like, since the extending portions 212A of the oppositely facing portion 210A of the inner spacer 2A or the extending portions 212B of the oppositely facing portion 210B of the outer spacer 2B is elastically deformed, such a change in distance can be absorbed.

In this manner, in the energy storage apparatus, even when the distance between the oppositely facing portions 210A of the inner spacers 2A is narrowed or the distance between the oppositely facing portion 210A of the inner spacer 2A and the oppositely facing portion 210B of the outer spacer 2B is narrowed due to an error in manufacture or the like, a state where the extending portions 212A of the inner spacer 2A are brought into contact with the oppositely facing portion 210A of another inner spacer 2A or the oppositely facing portion 210B of the outer spacer 2B and a state where the extending portions 212B of the outer spacer 2B are brought into contact with the oppositely facing portion 210A of the inner spacer 2A can be maintained.

In the oppositely facing portion 210A of each inner spacer 2A, the pair of inclined surfaces 216A is formed such that the distance between the pair of inclined surfaces 216A is gradually narrowed as the inclined surfaces 216A extend toward a bottom surface side of the recessed portion 217A. Accordingly, the pair of extending portions 212A of the inner spacer 2A or the pair of extending portions 212B of the outer spacer 2B is elastically deformed such that the narrower the distance between the oppositely facing portion 210A of the inner spacer 2A and the oppositely facing portion 210A of another inner spacer 2A which is disposed adjacently to the inner spacer 2A on the other side in the X axis direction or the narrower the distance between the opposedly facing portion 210A of the inner spacer 2A and the opposedly facing portion 210B of the outer spacer 2B, the narrower the distance between the distal ends of the pair of extending portions 212A of the inner spacer 2A becomes or the narrower the distance between the distal ends of the pair of extending portions 212B of the outer spacer 2B becomes.

In the opposedly facing portion 210B of the other outer spacer 2B, the pair of inclined surfaces 216B is formed such that the distance between the pair of inclined surfaces 216B is narrowed as the inclined surfaces 216B extend toward a bottom surface side of the recessed portion 217B. Accordingly, the pair of extending portions 212A of the inner spacer 2A is elastically deformed such that the narrower the distance between the opposedly facing portion 210B of the other outer spacer 2B and the opposedly facing portion 210A of another inner spacer 2A which is disposed adjacently to the other outer spacer 2B on the other side in the X axis direction, the narrower the distance between the distal ends of the pair of extending portions 212A becomes.

Therefore, in the energy storage apparatus, as the distance between the opposedly facing portion 210A of the inner spacer 2A and the opposedly facing portion 210B of the outer spacer 2B is narrowed, a force of the extending portions 212A of the inner spacer 2A and a force of the extending portions 212B of the outer spacer 2B which intend to return the distance between the opposedly facing portions 210A and 210B to an initial distance are increased. Accordingly, it is possible to provide a state which is considered equal to a state where the spacers 2 disposed adjacently to each other in the X axis direction are connected to each other by an elastic body and hence, resistance against vibrations in the energy storage apparatus can be enhanced.

The opposedly facing portion 210A of the inner spacer 2A includes a plurality of (two in this embodiment) extending portions 212A.

With such a configuration, with the provision of two extending portions 212A of the inner spacer 2A, it is possible to obstruct the flow of air between the pair of opposedly facing portions 210A toward the end edge of the opposedly facing portion 210A on a side opposite to the ventilation passage 203A from the end edge of the opposedly facing portion 210A on a ventilation passage 203A side. Accordingly, it is possible to more effectively suppress a leakage of cooling air to the outside of the energy storage apparatus through between the pair of opposedly facing portions 210A.

The opposedly facing portion 210B of the outer spacer 2B includes the plurality of (two in this embodiment) extending portions 212B.

With such a configuration, in the energy storage apparatus, with the provision of the plurality of extending portions 212B of the outer spacer 2B, it is possible to obstruct the flow of air toward the end edge of the opposedly facing portion 210B on a side opposite to the ventilation passage 202B from the end edge of the opposedly facing portion 210B on a ventilation passage 202B side between the opposedly facing portion 210B of the outer spacer 2B and the opposedly facing portion 210A of the inner spacer 2A. Accordingly, it is possible to more effectively suppress a leakage of cooling air to the outside of the energy storage apparatus through between the opposedly facing portion 210B of the outer spacer 2B and the opposedly facing portion 210A of the inner spacer 2A.

In each inner spacer 2A, the pair of opposedly facing portions 210A disposed adjacently to each other defines a gap extending in the Z axis direction.

With such a configuration, the relative positions of the pair of opposedly facing portions 210A in the X axis direction can be changed following the expansion and shrinkage of the energy storage device 1.

The holder 3 which collectively holds the energy storage devices 1 and the inner spacers 2A includes the frame 31 which extends in the X axis direction along which the pair of opposedly facing portions 210A opposedly faces each other and is disposed on one side of the energy storage device 1 in a direction orthogonal to the X axis direction (Y axis direction or Z axis direction). The pair of opposedly facing portions 210A is sandwiched between the energy storage device 1 and the frame 31 in a direction (Y axis direction or Z axis direction) orthogonal to the X axis direction. Further, the extending portions 212A and the inclined surfaces 216A of the opposedly facing portion 210A are sandwiched between the energy storage devices 1 and the frame 31 in the direction (Y axis direction or Z axis direction) orthogonal to the X axis direction.

With such a configuration, the pair of opposedly facing portions 210A, the extending portions 212A and the inclined surfaces 216A are protected from physical contact from the outside of the energy storage apparatus. As a result, it is possible to suppress the release of a contact state between the extending portions 212A and the inclined surfaces 216A due to a physical contact.

The energy storage apparatus includes the insulator 4 disposed between the energy storage devices 1 and the frame 31, and the pair of opposedly facing portions 210A is sandwiched between the energy storage devices 1 and the insulator 4 in the direction (Y axis direction or Z axis direction) orthogonal to the X axis direction. Further, the extending portions 212A and the inclined surfaces 216A of the opposedly facing portion 210A are sandwiched between the energy storage devices 1 and the insulator 4 in the direction (Y axis direction or Z axis direction) orthogonal to the X axis direction.

With such a configuration, even when a stress is applied to the pair of opposedly facing portions 210A, the extending portions 212A and the inclined surfaces 216A from the outside of the energy storage apparatus, such a stress is alleviated by the insulator. As a result, it is possible to suppress the release of a contact state between the extending portions 212A and the inclined surfaces 216A.

The energy storage apparatus in the above-mentioned embodiment includes:

at least one energy storage device 1 formed into an angular cylindrical shape having the pair of first walls 100c which opposedly faces each other in the X axis direction and the pair of second walls 100d which opposedly faces each other with the pair of first walls 100c sandwiched therebetween;

the first spacer (the inner spacer 2A or the outer spacer 2B) which is disposed adjacently to the energy storage device 1 in the X axis direction and forms the ventilation passage which allows cooling air to pass therethrough in the Y axis direction orthogonal to the X axis direction between the first spacer (the inner spacer 2A or the outer spacer 2B) and the energy storage device 1; and the second spacer (the inner spacer 2A or the outer spacer 2B) disposed adjacently to the first spacer with the energy storage device 1 sandwiched between the first spacer and the second spacer, wherein the first spacer has the first opposedly facing portion 210A which opposedly faces the second spacer in the X axis direction, the second spacer has a second opposedly facing portion (the opposedly facing portion 210A of the inner spacer 2A or the opposedly facing portion 210B of the outer spacer 2B) which opposedly faces the first opposedly facing portion of the first spacer (the opposedly facing portion 210A of the inner spacer 2A or the opposedly facing portion 210B of the outer spacer 2B) in the X axis direction, the first opposedly facing portion has the extending portion (the extending portions 212A of the inner spacer 2A or the extending portions 212B of the outer spacer 2B) extending toward the second opposedly facing portion, and the extending portion is brought into contact with the second opposedly facing portion.

With such a configuration, in the energy storage apparatus, cooling air which intends to flow through between the opposedly facing portions 210A of the inner spacers 2A which are disposed adjacently to each other in the X axis direction and between the opposedly facing portion 210A of the inner spacer 2A and the opposedly facing portion 210B of the outer spacer 2B which are disposed adjacently to each other in the X axis direction is blocked by the extending portions 212A of the opposedly facing portions 210A of the inner spacers 2A or the extending portions 212B of the opposedly facing portion 210B of the outer spacer 2B.

Figure 11:
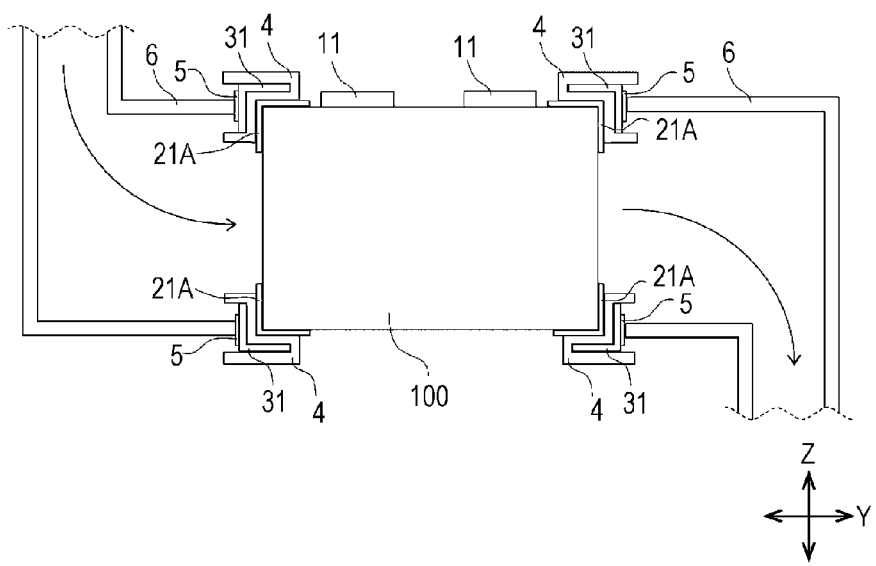
FIG. 11 is a schematic view for describing a state where a duct is mounted on the energy storage apparatus.
Figure 12:
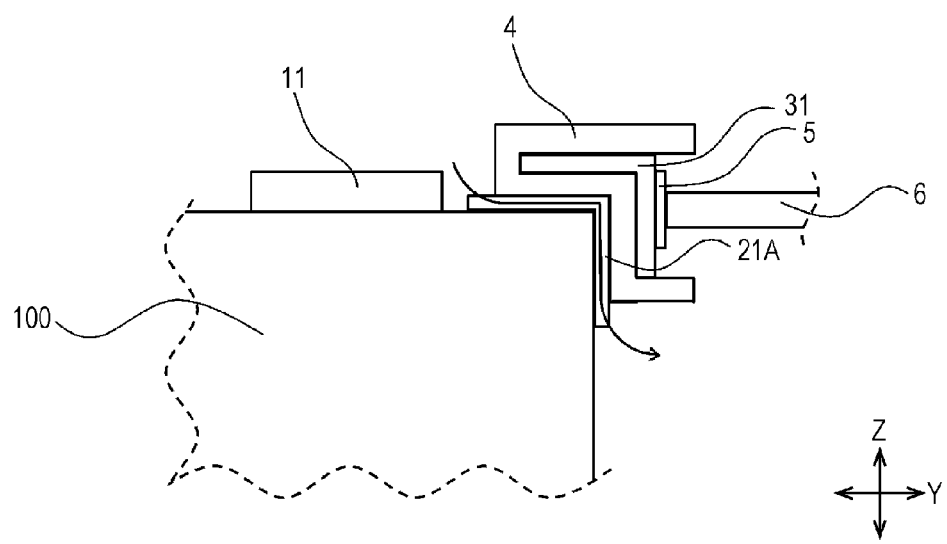
FIG. 12 is a schematic view for describing the flow of cooling air in a state where the duct is mounted on the energy storage apparatus.
Figure 13:
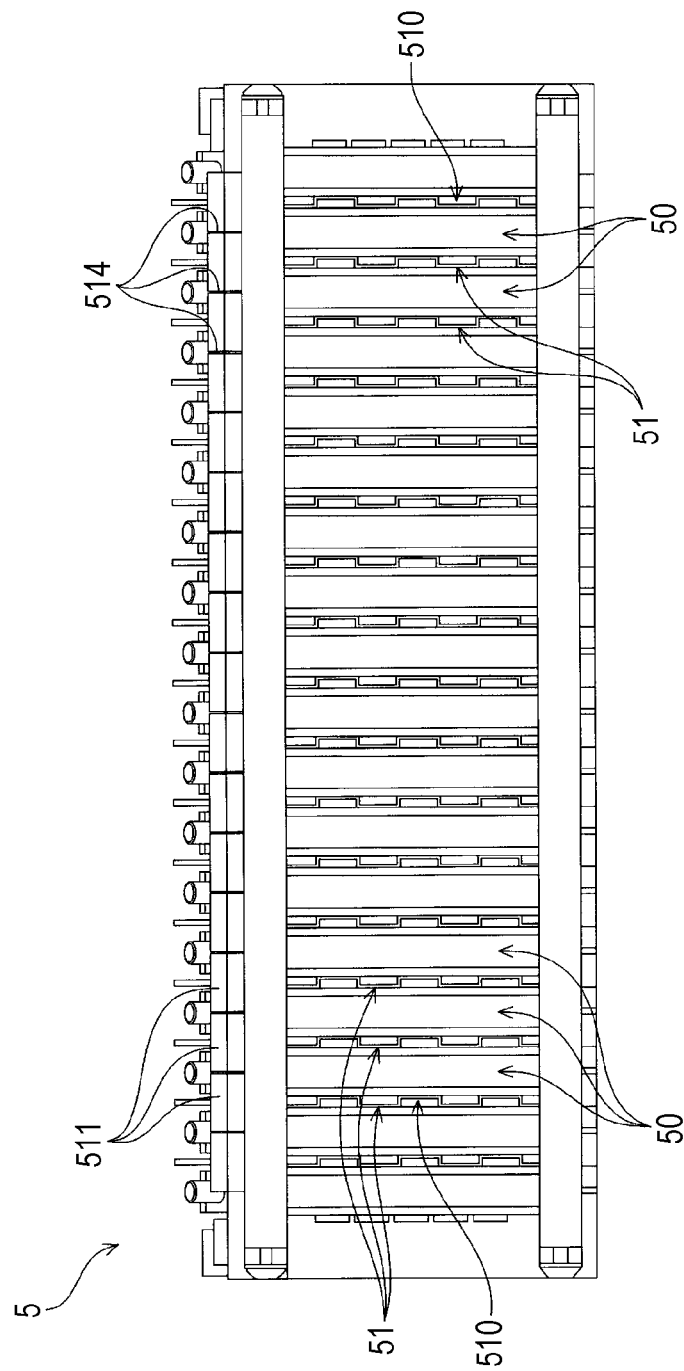
FIG. 13 is a side view of a conventional energy storage apparatus.
Figure 14:
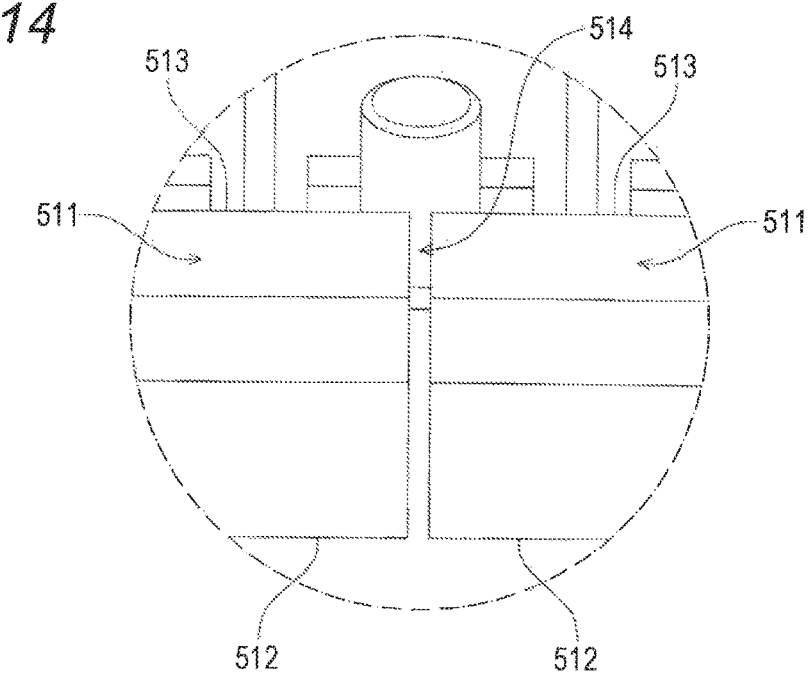
FIG. 14 is an enlarged view of the conventional energy storage apparatus in the vicinity of a portion where spacers opposedly face each other.
Figure 15:
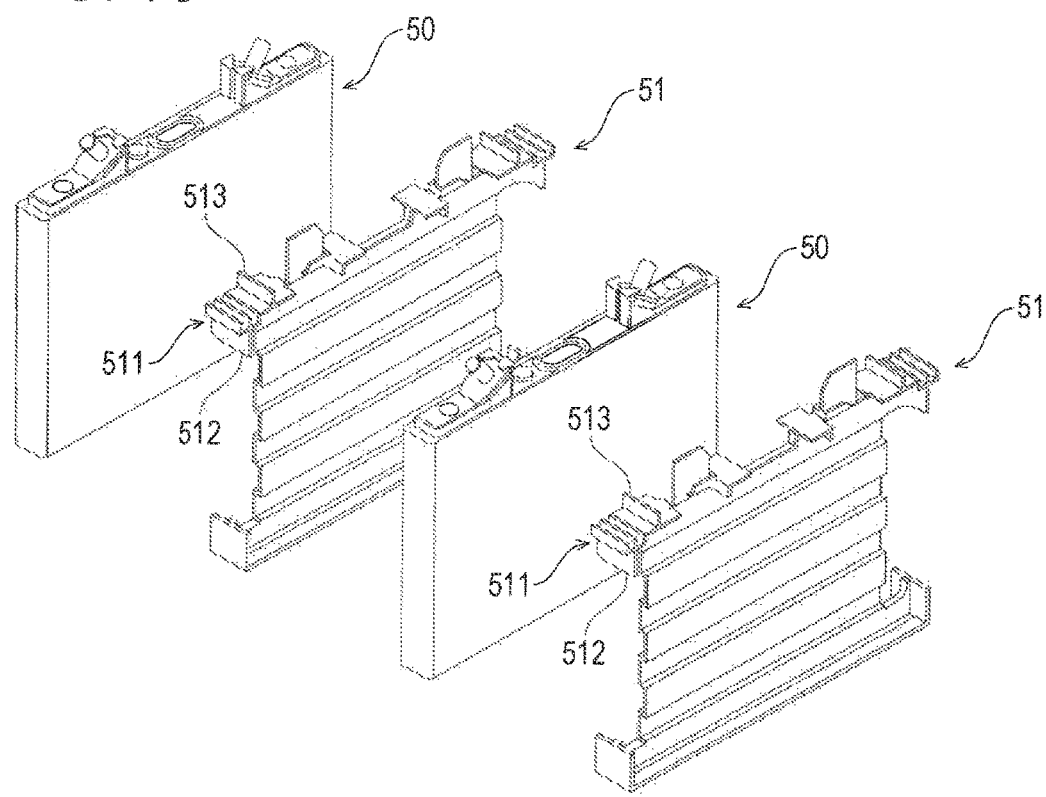
FIG. 15 is an exploded perspective view of the conventional energy storage apparatus.

FIG. 11 and FIG. 12 show a state where a duct 6 is mounted on the energy storage apparatus. In the energy storage apparatus in this embodiment, an exhaust fan (not shown in the drawing) is mounted on the duct 6 and hence, cooling air flows through between energy storage devices 1 disposed adjacently to each other through a path indicated by an arrow in FIG. 11. In this case, when the extending portion is not brought into contact with the second opposedly facing portion, cooling air flows through between the pair of opposedly facing portions through a path indicated by an arrow in FIG. 12. To be more specific, in the above-mentioned embodiment, a sealing member 5 is disposed between the frame 31 and the duct 6 and hence, there is almost no cooling air which passes between the frame 31 and the duct 6. On the other hand, when the extending portions are not brought into contact with the second opposedly facing portion, as indicated by an arrow in FIG. 12, cooling air flows through between the pair of opposedly facing portions which is sandwiched between the energy storage device 1 and the frame 31. Accordingly, there is a concern that a portion of a fluid sucked by the exhaust fan does not flow through between the energy storage devices 1. In the above-mentioned embodiment, the extending portions are brought into contact with the second opposedly facing portion and hence, it is possible to block cooling air which may flow through between the pair of opposedly facing portions when the extending portions are not brought into contact with the second opposedly facing portion.

It is preferable that the second opposedly facing portion have a recessed portion and the extending portion be brought into contact with the inner surface of the recessed portion. The energy storage apparatus in this embodiment includes the recessed portions 217A formed on the respective inner spacers 2A, and the recessed portion 217B which is formed on one outer spacer 2B. As shown in FIG. 7, the recessed portion 217A of the inner spacer 2A is defined by the pair of inclined surfaces 216A and the bottom portion which connects the pair of inclined surfaces 216A to each other. As shown in FIG. 9, the recessed portion 217B of the outer spacer 2B is defined by the pair of inclined surfaces 216B and the bottom portion which connects the pair of inclined surfaces 216B to each other.

With such a configuration, a portion of the extending portion which is brought into contact with the inner surface of the recessed portion is accommodated in the recessed portion and hence, it is possible to suppress the release of a contact state between the extending portion and the inner surface of the recessed portion which may be caused by a physical contact from the outside of the energy storage apparatus.

In this case, it is preferable that the extending portion be brought into contact with the inner surfaces of the recessed portion in the Z axis direction.

With such a configuration, even when the pair of opposedly facing portions is displaced in the X axis direction due to the expansion or the shrinkage of the energy storage device 1, it is possible to suppress a change in a contact state between the extending portion and the inner surfaces of the recessed portion.

It is preferable that the first opposedly facing portion have a plurality of extending portions and the plurality of extending portions respectively be brought into contact with the inner surfaces of the recessed portion.

With such a configuration, it is possible to effectively block cooling air which may flow through between the pair of opposedly facing portions when the respective extending portions are not brought into contact with the inner surfaces of the recessed portion.

The plurality of extending portions are disposed in a spaced-apart manner in the Z axis direction, and a gap or gaps extending in the X axis direction is/are defined by the plurality of extending portions.

In the energy storage apparatus in this embodiment, each inner spacer 2A includes the pair of extending portions 212A, and one outer spacer 2B includes the pair of extending portions 212B. The pair of extending portions 212A is disposed in a spaced-apart manner in the Z axis direction and defines a gap extending in the X axis direction therebetween. Out of the pair of extending portions 212A, the extending portion 212A disposed on an upper side in the Z axis direction is brought into contact with the inner surface of the recessed portion on an upper side of the extending portion 212A, and out of the pair of extending portions 212A, the extending portion 212A disposed on a lower side in the Z axis direction is brought into contact with the inner surface of the recessed portion on a lower side of the extending portion 212A. Since the pair of extending portions 212A defines the gap extending in the X axis direction, the pair of extending portions 212A can be displaced in conformity with the defined gap when the pair of extending portions 212A is brought into contact with the inner surfaces of the recessed portion in the Z axis direction. As a result, a stress generated on the pair of extending portions 212A can be alleviated by the gap. The pair of extending portions 212B of the outer spacer 2B can acquire substantially the same advantageous effect.

It is preferable that a gap be defined between the distal end portion of the extending portion and the inner surface of the recessed portion in the X axis direction.

With such a configuration, it is possible to change relative positions of the extending portion or the recessed portion in the X axis direction following the expansion or the shrinkage of the energy storage device 1.

Further, it is preferable that a gap extending in the Z axis direction be defined between the first opposedly facing portion and the second opposedly facing portion.

With such a configuration, it is possible to change relative positions of the first opposedly facing portion and the second opposedly facing portion in the X axis direction following the expansion or the shrinkage of the energy storage device 1.

It is preferable that the holder which collectively holds the energy storage devices, the first spacers and the second spacers have a frame extending in the X axis direction and being disposed on one side of the energy storage devices in a direction orthogonal to the X axis direction (Y axis direction or Z axis direction), and the first opposedly facing portions and the second opposedly facing portions be sandwiched between the energy storage devices and the frame in the direction orthogonal to the X axis direction (Y axis direction or Z axis direction).

With such a configuration, the first opposedly facing portions and the second opposedly facing portions are protected from a physical contact from the outside of the energy storage apparatus. As a result, it is possible to suppress the release of a contact state between the extending portion and the second opposedly facing portion which may be caused by the physical contact.

It is preferable that the energy storage apparatus further include the insulator disposed between the energy storage devices and the frame, and the first opposedly facing portions and the second opposedly facing portions be sandwiched between the energy storage devices and the insulator in a direction orthogonal to the X axis direction (Y axis direction or Z axis direction).

With such a configuration, even when a stress is applied to the first opposedly facing portions and the second opposedly facing portions from the outside of the energy storage apparatus, such a stress is alleviated by the insulator. As a result, it is possible to suppress the release of a contact state between the extending portion and the second opposedly facing portion.

It is needless to say that the energy storage apparatus according to the present invention is not limited to the above-mentioned embodiment, and various modifications are conceivable without departing from the gist of the present invention.

In the above-mentioned embodiment, the base 20A of the inner spacer 2A has an approximately rectangular shape, and has a size substantially equal to a size of the first wall 100c of the energy storage device 1. However, provided that the base 20A of the inner spacer 2A can make the respective postures of two energy storage devices 1 disposed adjacently to each other correspond to each other, the shape of the base 20A of the inner spacer 2A is not limited to an approximately rectangular shape, and the size of the base 20A of the inner spacer 2A is also not limited to a size substantially equal to the size of the first wall 100c of the energy storage device 1.

In the above-mentioned embodiment, by forming the base 20A of the inner spacer 2A into a rectangular corrugated shape, the ventilation passages 203A are formed between the base 20A and the energy storage device 1. However, provided that a fluid can be made to pass through between the first surface of the inner spacer 2A and the energy storage device 1 (between the second surface and the energy storage device 1), the shape of the base 20A of the inner spacer 2A is not limited to a rectangular corrugated shape. Further, when it is unnecessary to form the ventilation passages 203A between the base 20A of the inner spacer 2A and the energy storage device 1, the base 20A of the inner spacer 2A may be formed into a flat plate shape.

In the above-mentioned embodiment, the respective restricting portions 21A of the inner spacer 2A are formed on the respective corner portions of the base 20A. However, provided that the restricting portions 21A of the inner spacer 2A can determine the position of the energy storage device 1 with respect to the base 20A, the positions on the base 20A where the restricting portions 21A are formed are not limited.

In the above-mentioned embodiment, the base 20B of the outer spacer 2B has an approximately rectangular shape, and has a size substantially equal to a size of the first wall 100c of the energy storage device 1. However, provided that the base 20B can make the posture of the energy storage device 1 disposed adjacently to the outer spacer 2B and the posture of the end plate 30 correspond to each other, the shape of the base 20B is not limited to an approximately rectangular shape, and the size of the base 20B is also not limited to a size substantially equal to the size of the first wall 100c of the energy storage device 1.

In the above-mentioned embodiment, in the outer spacer 2B, the restricting portion 21B is formed on the respective corner portions of the base 20B. However, provided that the restricting portions 21B can determine the position where the energy storage device 1 is disposed with respect to the base 20B, the positions where the restricting portions 21B are formed on the base 20B are not limited.

In the above-mentioned embodiment, the opposedly facing portion 210A of the inner spacer 2A includes the pair of extending portions 212A. However, the configuration of the opposedly facing portion 210A is not limited to the above. For example, the opposedly facing portion 210A of the inner spacer 2A may include one extending portion 212A or three or more extending portions 212A. Further, the opposedly facing portion 210A of the inner spacer 2A may include plural pairs of extending portions 212A.

The opposedly facing portion 210B of the outer spacer 2B includes the pair of extending portions 212B. However, the configuration of the opposedly facing portion 210B is not limited to the above. For example, the opposedly facing portion 210B of the outer spacer 2B may include one extending portion 212B or three or more extending portions 212B. Further, the opposedly facing portion 210B of the outer spacer 2B may include plural pairs of extending portions 212B.

In the above-mentioned embodiment, the inclined surface 216A of the inner spacer 2A is inclined with respect to the X axis direction as well as with respect to the Z axis direction. However, the configuration of the inclined surface 216A is not limited to the above. Provided that the extending portion 212A of the inner spacer 2A or the extending portion 212B of the outer spacer 2B can be brought into contact with the inclined surface 216A of the inner spacer 2A, the inclination direction of the inclined surface 216A is not particularly limited.

In the above-mentioned embodiment, the inclined surface 216B of the outer spacer 2B is inclined with respect to the X axis direction as well as with respect to the Z axis direction. However, the configuration of the inclined surface 216B is not limited to the above. Provided that the extending portion 212A of the inner spacer 2A can be brought into contact with the inclined surface 216B of the outer spacer 2B, the inclination direction of the inclined surface 216B is not particularly limited.

In the above-mentioned embodiment, the extending portion 212A of the inner spacer 2A is configured to be brought into contact with the inclined surfaces 216A of the inner spacer 2A. However, the configuration of the extending portion 212A is not limited to the above. For example, the extending portion 212A of the inner spacer 2A may be configured such that the distal end portion of the extending portion 212A is made to abut against oppositely facing portion 210A (the bottom surface of the recessed portion 217A) of the inner spacer 2A in the X axis direction.

Also with such a configuration, the extending portion 212A of the inner spacer 2A is brought into contact with the oppositely facing portion 210A and hence, cooling air is minimally leaked through between the oppositely facing portions 210A of the inner spacers 2A disposed adjacently to each other in the X axis direction.

The extending portion 212B of the outer spacer 2B is also configured to be brought into contact with the inclined surface 216A of the inner spacer 2A. However, the configuration of the extending portion 212B is not limited to the above. For example, the extending portion 212B of the outer spacer 2B may be configured such that the distal end portion of the extending portion 212B is made to abut against oppositely facing portion 210A (the bottom surface of the recessed portion 217A) of the inner spacer 2A in the X axis direction.

Also with such a configuration, the extending portion 212B of the outer spacer 2B is brought into contact with the oppositely facing portion 210A of the inner spacer 2A and hence, cooling air is minimally leaked through between the oppositely facing portion 210B of the outer spacer 2B and the oppositely facing portion 210A of the inner spacer 2A.

In the above-mentioned embodiment, the inclined surface 216A of the inner spacer 2A is inclined with respect to the X axis direction as well as with respect to the Z axis direction. However, the configuration of the inclined surface 216A is not limited to the above. For example, the inclined surface 216A of the inner spacer 2A may be configured such that a portion of the inclined surface 216A of the inner spacer 2A with which the extending portion 212A of the inner spacer 2A or the extending portion 212B of the outer spacer 2B is brought into contact is formed of a flat surface extending in the X axis direction as well as in the Y axis direction.

That is, provided that the extending portion 212A of the inner spacer 2A or the extending portion 212B of the outer spacer 2B can be brought into contact with the inclined surface 216A of the inner spacer 2A, the inclined surface 216A of the inner spacer 2A may be formed orthogonal to the Z axis direction.

In the above-mentioned embodiment, the inclined surface 216B of the outer spacer 2B is inclined with respect to the X axis direction as well as with respect to the Z axis direction. However, the configuration of the inclined surface 216B is not limited to the above. For example, the inclined surface 216B of the outer spacer 2B may be configured such that a portion of the inclined surface 216B of the outer spacer 2B with which the extending portion 212A of the inner spacer 2A is brought into contact is formed of a flat surface extending in the X axis direction as well as in the Y axis direction.

That is, provided that the extending portion 212A of the inner spacer 2A can be brought into contact with the inclined surface 216B of the outer spacer 2B, the inclined surface 216B of the outer spacer 2B may not be inclined with respect to the X axis direction as well as with respect to the Z axis direction.

In the above-mentioned embodiment, the extending portion 212A of the inner spacer 2A has elasticity. However, the configuration of the extending portion 212A of the inner spacer 2A is not limited to the above. For example, the extending portion 212A of the inner spacer 2A may not have elasticity.

In the above-mentioned embodiment, the extending portion 212A of the inner spacer 2A is configured such that the contact surface 215A is bent at an intermediate position thereof in the X direction. However, the configuration of the extending portion 212A of the inner spacer 2A is not limited to the above. For example, the extending portion 212A of the inner spacer 2A may be inclined with respect to the X axis direction as well as with respect to the Z axis direction over the whole region thereof. That is, the contact surface 215A of the extending portion 212A of the inner spacer 2A may be formed of only the inclined surface 216A.

In the above-mentioned embodiment, the extending portion 212B of the outer spacer 2B is configured such that the contact surface 215B is bent at an intermediate position thereof in the X axis direction. However, the configuration of the extending portion 212B of the outer spacer 2B is not limited to the above. For example, the extending portion 212B of the outer spacer 2B may be inclined with respect to the X axis direction as well as with respect to the Z axis direction over the whole region thereof. That is, the contact surface 215B of the extending portion 212B of the outer spacer 2B may be formed of only the inclined surface 216B.

Although not particularly described in the above-mentioned embodiment, the oppositely facing portion 210A of the inner spacer 2A may be configured to be brought into contact with the inclined surface 213A of the extending portion 212A. Further, it is preferable that the oppositely facing portion 210A of the inner spacer 2A be configured such that the inclined surface 213A of the extending portion 212A and the inclined surface 216A of the other inner spacer 2A disposed adjacently to the inner spacer 2A in the X axis direction (or the inclined surface 216B of the outer spacer 2B disposed adjacently to the inner spacer 2A in the X axis direction) are brought into contact with each other.

The oppositely facing portion 210B of the outer spacer 2B may be also configured to be brought into contact with the inclined surface 213B of the extending portion 212B. Further, it is preferable that the oppositely facing portion 210B of the outer spacer 2B be configured such that the inclined surface 213B of the extending portion 212B and the inclined surface 216A of the inner spacer 2A disposed adjacently to the outer spacer 2B in the X axis direction are brought into contact with each other.

With such a configuration, the extending portion 212B and the inclined surface 216A are brought into contact with each other such that the contact portion between the inclined surface 213B of the extending portion 212B of the outer spacer 2B and the oppositely facing portion 210A of the inner spacer 2A extends in a direction intersecting with the Z axis direction. Accordingly, it is possible to more effectively obstruct the flow of air between the oppositely facing portions 212B, 210A toward the end edge of the oppositely facing portion 210A on a side opposite to the ventilation passage 203A from the end edge of the oppositely facing portion 210A on a ventilation passage 203A side.

When the inclined surface 213A of the extending portion 212A and the inclined surface 216A of the inner spacer 2A disposed adjacently to the inner spacer 2A in the X axis direction (the inclined surface 216B of the outer spacer 2B disposed adjacently to the inner spacer 2A in the X axis direction) are brought into contact with each other, and when, in the oppositely facing portion 210B of the outer spacer 2B, the inclined surface 216B of the extending portion 212B and the inclined surface 216A of the inner spacer 2A disposed adjacently to the outer spacer 2B in the X axis direction are brought into contact with each other, the extending portion (first inclined surface) and the other opposedly facing portion 210A (second inclined surface) are brought into contact with each other such that the contact portions between the inclined surfaces 213A, 216B and the inclined surface 216A extend in a direction intersecting with the second direction. With such a configuration, it is possible to more effectively obstruct the flow of air between the opposedly facing portions 210A toward the end edge of the opposedly facing portion 210A on a side opposite to the ventilation passage 203A from the end edge of the opposedly facing portion 210A on a ventilation passage 203A side.

Figure 10:
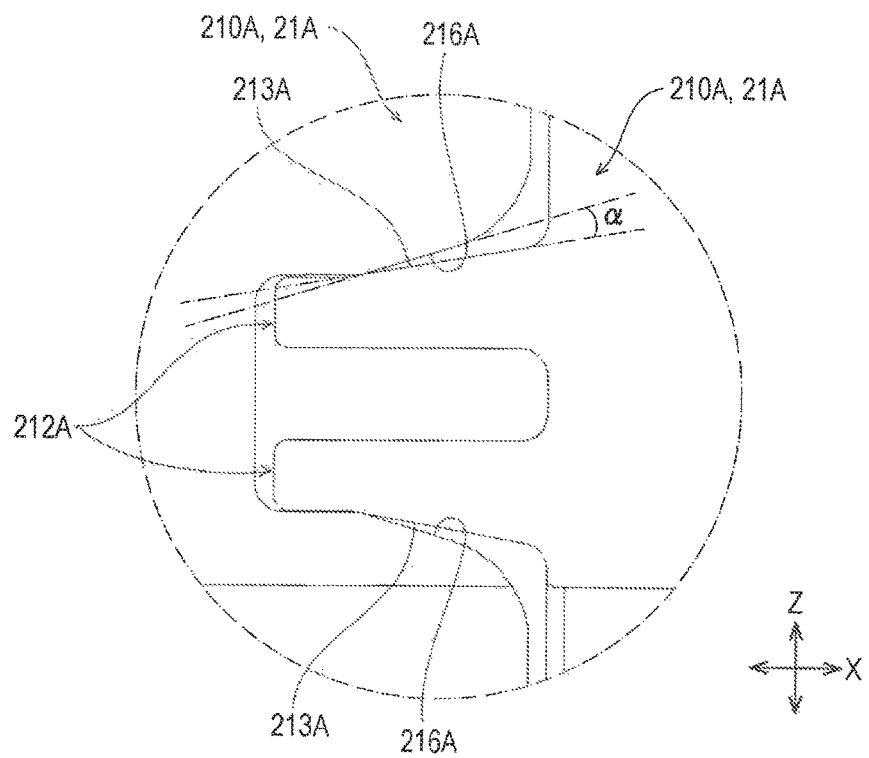
FIG. 10 is an enlarged view of an energy storage apparatus according to another embodiment of the present invention.

In this case, as shown in FIG. 10, it is preferable that the extending portion 212A of the inner spacer 2A be configured such that an angle α made by the inclined surface 213A and the inclined surface 216A of the neighboring inner spacer 2A in the X axis direction (the inclined surface 216B of the neighboring outer spacer 2B in the X axis direction) is set to a value which satisfies 0°<α.

It is preferable that the extending portion 212B of the outer spacer 2B be configured such that an angle α made by the inclined surface 213B and the inclined surface 216A of the neighboring inner spacer 2A in the X axis direction is set to a value which satisfies 0°<α.

When the inclined surface 213A, 213B and the inclined surface 216A are parallel to each other, there may be a case where a gap is formed between the inclined surfaces 213A, 213B and the inclined surface 216A due to an error in manufacture at the time of manufacturing the spacer. However, with the configuration described above, by setting the angle α larger than 0°, that is, by setting the first inclined surfaces 213A, 213B and the inclined surface 216A not parallel to each other, it is possible to prevent the formation of the above-mentioned gap due to an error in manufacture.

It is more preferable that the extending portion 212A of the inner spacer 2A be configured such that the angle α made by the inclined surface 213A and the inclined surface 216A of the inner spacer 2A disposed adjacently to the inner spacer 2A in the X axis direction (the inclined surface 216B of the neighboring outer spacer 2B in the X axis direction) is set to a value which satisfies 0°<α≤15°.

It is more preferable that the extending portion 212B of the outer spacer 2B be configured such that the angle α made by the inclined surface 213B and the inclined surface 216A of the neighboring inner spacer 2A in the X axis direction is set to a value which satisfies 0°<α≤15°.

Although not particularly mentioned in the above-described embodiment, it is preferable that the extending portion 212A of the inner spacer 2A be brought into contact with the inclined surface 216A of the inner spacer 2A or the inclined surface 216B of the outer spacer 2B over a range from one end to the other end on a side opposite to one end in the Y axis direction.

It is preferable that the extending portion 212B of the outer spacer 2B be brought into contact with the inclined surface 216A of the inner spacer 2A over a range from one end to the other end on a side opposite to one end in the Y axis direction.

In the above-mentioned embodiment, the extending portion 212A of the inner spacer 2A is configured to be brought into contact with a portion of the inclined surface 216A of the inner spacer 2A or with a portion of the inclined surface 216B of the outer spacer 2B. However, the configuration of the extending portion 212A of the inner spacer 2A is not limited to the above. For example, the extending portion 212A of the inner spacer 2A may be brought into contact with the whole region of the inclined surface 216A of the inner spacer 2A or the whole region of the inclined surface 216B of the outer spacer 2B.

With such a configuration, in the whole region between the opposedly facing portions 210A in the flow direction of cooling air, it is possible to obstruct the flow of air between the opposedly facing portions 210A toward the end edge of the opposedly facing portion 210A on a side opposite to the ventilation passage 203A from the end edge of the opposedly facing portion 210A on a ventilation passage 203A side. Accordingly, it is possible to more effectively suppress a leakage of cooling air to the outside of the energy storage apparatus through between the pair of opposedly facing portions 210A.

In the above-mentioned embodiment, the exhaust fan which generates the flow of a fluid by lowering a pressure in the duct 6 is mounted on the energy storage apparatus. However, an intake fan which generates the flow of a fluid by increasing a pressure in the duct 6 may be mounted on the energy storage apparatus.

What is claimed is:

1. An energy storage apparatus, comprising:
at least one energy storage device; and
a spacer disposed adjacently to the energy storage device, the spacer being configured to form a ventilation passage which allows cooling air to pass therethrough between the spacer and the energy storage device,
wherein the spacer includes an opposedly facing portion which opposedly faces a spacer disposed adjacently to the spacer with the energy storage device sandwiched therebetween at a position which faces the ventilation passage and is disposed adjacently to the energy storage device in a flow direction of the cooling air in the ventilation passage,
wherein one opposedly facing portion of a pair of opposedly facing portions which opposedly faces each other of the spacers disposed on both sides of the energy storage device includes an extending portion extending toward an other opposedly facing portion of the pair of opposedly facing portions,
wherein the extending portion is brought into contact with the other opposedly facing portion,
wherein the other opposedly facing portion includes an inclined surface which is inclined with respect to a first direction along which the pair of opposedly facing portions opposedly faces each other and a second direction orthogonal to the flow direction of the cooling air,
wherein the extending portion is brought into contact with at least a portion of the inclined surface,
wherein the extending portion is elastically deformable due to a contact between the extending portion and the inclined portion,
wherein the other opposedly facing portion includes a pair of inclined surfaces which forms the inclined surface,
wherein the air of inclined surfaces are configured to opposedly face each other in a spaced-apart manner from each other in the second direction such that a distance between the pair of inclined surfaces is narrowed as the pair of inclined surfaces is away from one opposedly facing portion along a direction that the pair of opposedly facing portions opposedly faces each other,
wherein one opposedly facing portion includes a pair of extending portions at a position which opposedly faces the pair of inclined surfaces, and
wherein the pair of extending portions are disposed in a spaced-apart manner from each other in the second direction such that a distance between distal ends of the pair of extending portions is less than the distance between the inclined surfaces at end portions of the pair of inclined surfaces on one opposedly facing portion side, and is more than the distance between the inclined surfaces at end portions of the pair of inclined surfaces on a side opposite to one opposedly facing portion.

2. The energy storage apparatus according to claim 1, wherein one opposedly facing portion includes a plurality of extending portions which form the extending portion, and the other opposedly facing portion includes inclined surfaces which form the inclined surface such that a number of inclined surfaces corresponds to a number of the plurality of extending portions.

3. The energy storage apparatus according to claim 1, wherein the extending portion includes an inclined surface inclined with respect to the first direction along which the pair of opposedly facing portions opposedly faces each other and with respect to the second direction orthogonal to the flow direction of the cooling air, and
wherein the other opposedly facing portion is brought into contact with at least a portion of the inclined surface of the extending portion.

4. The energy storage apparatus according to claim 1, wherein the extending portion includes a first inclined surface inclined with respect to the first direction along which the pair of opposedly facing portions opposedly faces each other and with respect to t second direction orthogonal to the flow direction of the cooling air,
wherein the other opposedly facing portion includes a second inclined surface inclined with respect to the first direction along which the pair of opposedly facing portions opposedly faces each other and with respect to the second direction orthogonal to the flow direction of the cooling air, and
wherein the first inclined surface is brought into contact with at least a portion of the second inclined surface.

5. The energy storage apparatus according to claim 4, wherein an angle α of the second inclined surface with respect to the first inclined surface is set to a value which satisfies 0°<α.

6. The energy storage apparatus according to claim 1, wherein the extending portion is brought into contact with the other opposedly facing portion in a whole region of the other opposedly facing portion in the flow direction of the cooling air.

7. The energy storage apparatus according to claim 1, wherein the pair of opposedly facing portion defines a gap extending in the first direction along which the pair of opposedly facing portions opposedly faces each other and the second direction orthogonal to the flow direction of the cooling air.

8. The energy storage apparatus according to claim 1, further comprising a holder which is configured to collectively hold the energy storage device and the spacer,
wherein the holder includes a frame extending in the first direction along which the pair of opposedly facing portions opposedly faces each other and being disposed on one side of the energy storage device in a direction orthogonal to the first direction, and
wherein the pair of opposedly facing portions is sandwiched between the energy storage device and the frame in the direction orthogonal to the first direction.

9. The energy storage apparatus according to claim 8, further comprising an insulator disposed between the energy storage device and the frame,
wherein the pair of opposedly facing portions is sandwiched between the energy storage device and the insulator in the direction orthogonal to the first direction.

10. An energy storage apparatus, comprising:
at least one energy storage device formed into an angular cylindrical shape including a pair of first walls which opposedly faces each other in a first direction and a pair of second walls which opposedly faces each other with the pair of first walls sandwiched therebetween;
a first spacer which is disposed adjacently to the energy storage device in the first direction and forms a ventilation passage which allows cooling air to pass therethrough in a second direction orthogonal to the first direction between the first spacer and the energy storage device; and
a second spacer disposed adjacently to the first spacer with the energy storage device sandwiched between the first spacer and the second spacer,
wherein the first spacer includes a first opposedly facing portion which opposedly faces the second spacer in the first direction, the second spacer includes a second opposedly facing portion which opposedly faces the first opposedly facing portion of the first spacer in the first direction,
wherein the first opposedly facing portion includes an extending portion extending toward the second opposedly facing portion,
wherein the extending portion is brought into contact with the second opposedly facing portion, and
wherein a gap is defined between a distal end portion of the extending portion and an inner surface of a recessed portion in the first direction.

11. The energy storage apparatus according to claim 10, wherein the second opposedly facing portion includes the recessed portion, and
wherein the extending portion is brought into contact with an inner surface of the recessed portion.

12. The energy storage apparatus according to claim 11, wherein the extending portion is brought into contact with the inner surface of the recessed portion in a third direction orthogonal to the first direction and the second direction.

13. The energy storage apparatus according to claim 11, wherein the first opposedly facing portion includes a plurality of extending portions, and the plurality of extending portions are respectively brought into contact with the inner surface of the recessed portion.

14. The energy storage apparatus according to claim 13, wherein the plurality of extending portions are disposed at intervals in a third direction orthogonal to the first direction and the second direction, and defines the gap extending in the first direction.

15. The energy storage apparatus according to claim 10, wherein the first opposedly facing portion and the second opposedly facing portion define a gap extending in a third direction orthogonal to the first direction and the second direction.

16. The energy storage apparatus according to claim 10, further comprising a holder which is configured to collectively hold the energy storage device, the first spacer, and the second spacer,
wherein the holder includes a frame extending in the first direction and being disposed on one side of the energy storage device in a direction orthogonal to the first direction, and
wherein the first opposedly facing portion and the second opposedly facing portion are sandwiched between the energy storage device and the frame in a direction orthogonal to the first direction.

17. The energy storage apparatus according to claim 16, further comprising an insulator disposed between the energy storage device and the frame,
   wherein the first opposedly facing portion and the second opposedly facing portion are sandwiched between the energy storage device and the insulator in a direction orthogonal to the first direction.

* * * * *